United States Patent
Griffin et al.

(10) Patent No.: US 11,046,533 B2
(45) Date of Patent: Jun. 29, 2021

(54) MAGNETIC TRACK SYSTEM FOR TRANSPORTING BATTERIES AT TELECOMMUNICATION SITES

(71) Applicant: ETAK Systems, LLC, Huntersville, NC (US)

(72) Inventors: Michael Griffin, Indian Trail, NC (US); Lee Priest, Charlotte, NC (US)

(73) Assignee: ETAK Systems, LLC, Huntersville, NC (US)

(*) Notice: Subject to any disclaimer, the term of this patent is extended or adjusted under 35 U.S.C. 154(b) by 243 days.

(21) Appl. No.: 16/029,565

(22) Filed: Jul. 7, 2018

(65) Prior Publication Data

US 2018/0312348 A1    Nov. 1, 2018

Related U.S. Application Data

(63) Continuation-in-part of application No. 15/886,558, filed on Feb. 1, 2018, and a continuation-in-part of application No. 15/790,357, filed on Oct. 23, 2017, now Pat. No. 10,991,953, and a continuation-in-part of application No. 15/698,148, filed on Sep. 7, 2017, now Pat. No. 10,644,280, and a continuation-in-part of application No. 15/655,272, filed on Jul. 20, 2017, now Pat. No. 10,720,652, and a continuation-in-part of application No. 15/628,070, filed on Jun. 20, 2017, and a continuation-in-part of application No. 15/221,866, filed on Jul. 28, 2016.

(51) Int. Cl.
*B65G 54/02* (2006.01)
*H01M 50/20* (2021.01)
*H01M 50/256* (2021.01)

(52) U.S. Cl.
CPC .......... *B65G 54/02* (2013.01); *H01M 50/20* (2021.01); *H01M 50/256* (2021.01); *B65G 2201/02* (2013.01)

(58) Field of Classification Search
CPC . B65G 2201/02; B65G 54/02; H01M 2/1005; H01M 2/1077
See application file for complete search history.

(56) References Cited

U.S. PATENT DOCUMENTS

| | | | |
|---|---|---|---|
| 9,912,004 B2* | 3/2018 | Turner, III | H01M 10/0481 |
| 10,106,294 B2* | 10/2018 | Bottcher | B65D 19/44 |
| 10,644,280 B2* | 5/2020 | Hummer | H01M 2/1077 |
| 10,720,652 B2* | 7/2020 | Perry | H01M 6/5066 |
| 2020/0182715 A1* | 6/2020 | Fyfe | G01L 1/2206 |

* cited by examiner

*Primary Examiner* — Minh N Trinh
(74) *Attorney, Agent, or Firm* — Clements Bernard Walker; Lawrence A. Baratta, Jr.; Christine W. Beninati

(57) ABSTRACT

A magnetic track system for transporting batteries at a telecommunications site includes a plurality of pods which are magnetic and which are attachable to a battery; and a track system including repelling magnets, wherein the track system is selectively laid between a first point to a second point to transport the battery with the plurality of pods attached thereto, wherein the transport comprises pushing or pulling the battery along the track system. The track system can include a plurality of tracks, strips, or a rollable mat. The track system can have a length less than a distance between the first point and the second point, wherein the track system is moveable such that tracks which have already been traversed by the battery are moved to a front to accommodate the distance.

3 Claims, 22 Drawing Sheets

MAGNETIC TRACK SYSTEM FOR TRANSPORTING BATTERIES AT TELECOMMUNICATION SITES

CROSS-REFERENCE TO RELATED APPLICATION(S)

The present patent/application is a continuation-in-part of the following patents/applications, each of which is incorporated by reference in full:

| Filing Date | Serial No. | Title |
|---|---|---|
| Feb. 1, 2018 | 15/886,558 | BATTERY SECURITY SYSTEMS AND METHODS FOR TELECOMMUNICATION SITES |
| Oct. 23, 2017 | 15/790,357 | BATTERY HANDLING SYSTEMS AND METHODS FOR TELECOMMUNICATION SITES |
| Sep. 7, 2017 | 15/698,148 | DE-CELLING BATTERIES FOR INSTALLATION IN TELECOMMUNICATION SITES |
| Jul. 20, 2017 | 15/655,272 | BATTERY RECYCLING SYSTEMS AND METHODS ASSOCIATED WITH CELL SITES AND THE LIKE |
| Jun. 20, 2017 | 15/628,070 | BATTERY INSTALLATION WITH SECURITY SCREWS FOR THEFT DETERRENCE IN CELL SITE SHELTERS AND THE LIKE |
| Jul. 28, 2016 | 15/221,866 | BATTERY INSTALLATION IMPROVEMENT APPARATUS AND METHOD IN CELL SITE SHELTERS AND THE LIKE |

FIELD OF THE DISCLOSURE

The present disclosure generally relates to telecommunication site installation systems and methods. More particularly, the present disclosure relates to a magnetic track system for transporting batteries at telecommunication sites.

BACKGROUND OF THE DISCLOSURE

Due to the geographic coverage nature of wireless service, there are hundreds of thousands of cell towers in the United States. With over 200,000 cell sites in the U.S., geographically distributed everywhere, installation and maintenance at cell sites can be expensive, time-consuming, and complex. For example, cell sites include a shelter or cabinet located proximate to the cell tower. For network availability, the shelter or cabinet includes a battery backup for power redundancy when a primary power source is unavailable, such as commercial power. For example, depending on configuration, the battery backup may include 4, 8, 16, 48, etc. batteries which each can weigh several hundred pounds. The installation/removal process such batteries is labor intensive and slow. It would be advantageous to provide a battery installation improvement apparatus and method in cell site shelters and the like to address the labor intensity and speed. Also, it would be advantageous to provide methods for installers to deal with the severe weight of the batteries during installation.

Currently, operators are dealing with high battery theft rates. Former technicians, employees, and subcontractors with known site access information makes removal of batteries an easy target as in many cases no forced entry is required, in addition to third parties who simply break in. Batteries are either delivered directly to or are picked up by smelters and recyclers in exchange for currency based on lead content and weight—and thus can return a high dollar amount.

Additionally, with hundreds of thousands of batteries installed at existing cell sites—and given an average of 5 years of life expectancy—there is a continuous need to monitor and replace batteries. With ever increasing Environmental, Health & Safety (EH&S) regulations and requirements put on wireless carriers, there is a growing need to efficiently and properly remove, dispose, and recycle used batteries. Proper handling, packaging, storage, and transportation of batteries in the recycling process is a critical component of battery replacement services. A clear chain of custody is required from the original removal of batteries at cell sites through the final recycling certificate showing completion of proper disposal

BRIEF SUMMARY OF THE DISCLOSURE

A magnetic track system for transporting batteries at a telecommunications site includes a plurality of pods which are magnetic and which are attachable to a battery; and a track system including repelling magnets, wherein the track system is selectively laid between a first point to a second point to transport the battery with the plurality of pods attached thereto, wherein the transport comprises pushing or pulling the battery along the track system. The track system can include a plurality of tracks, strips, or a rollable mat. The track system can have a length less than a distance between the first point and the second point, wherein the track system is moveable such that tracks which have already been traversed by the battery are moved to a front to accommodate the distance.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a flowchart of a battery installation method with security screws for theft deterrence in cell site shelters and the like;

DETAILED DESCRIPTION OF THE DISCLOSURE

Figure 1:
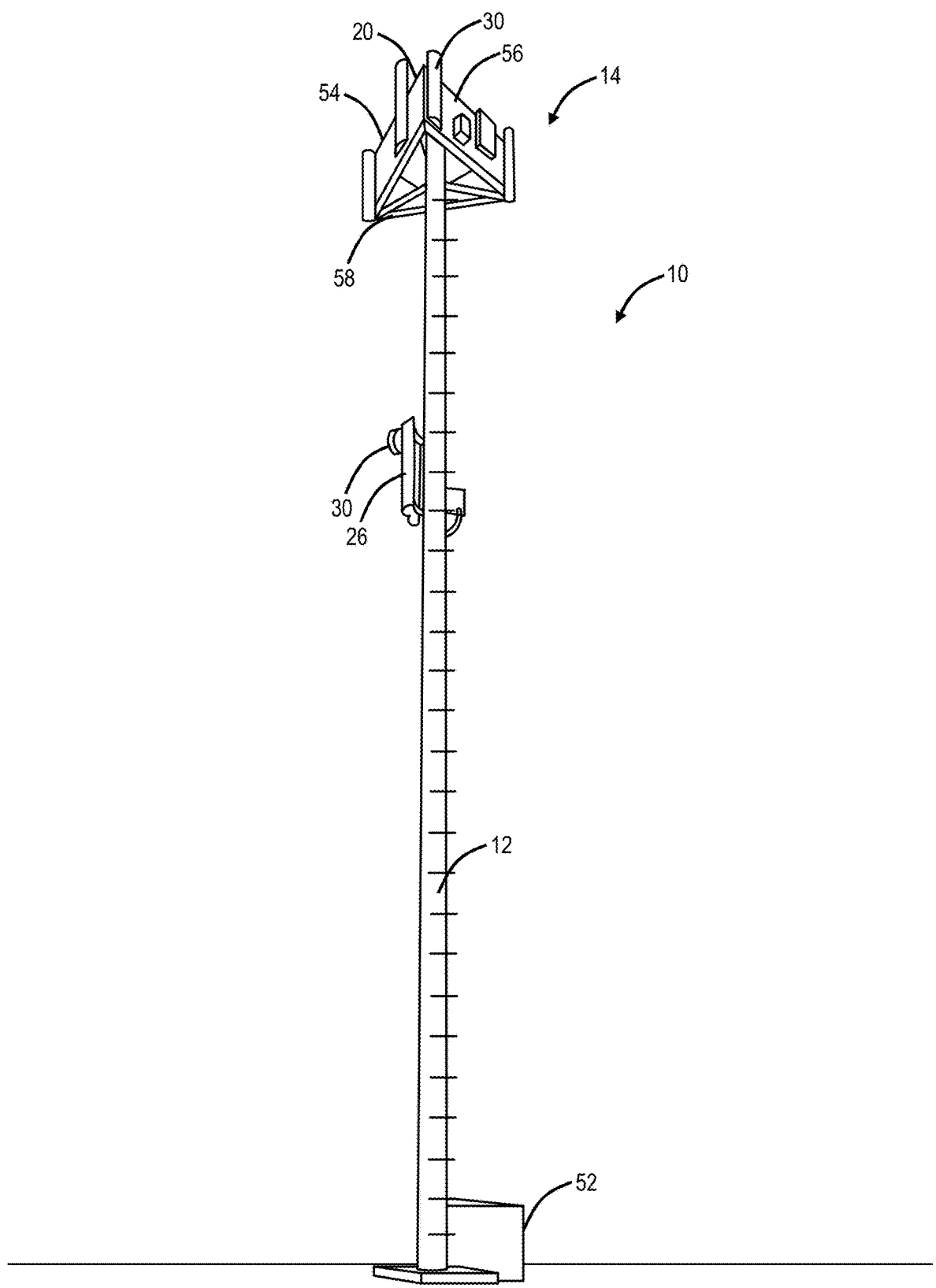
FIG. 1 is a diagram of an example cell site.

In various embodiments, the present disclosure relates to a magnetic track system for transporting batteries at telecommunication sites. The magnetic track system efficiently enables transport of batteries to/from a cabinet, shelter, etc. Also, in various embodiments, the present disclosure relates to battery security systems and methods for telecommunication sites, such as cell sites. Specifically, the battery security systems and methods include a reinforced battery retention bracket for securing batteries in a telecommunication site, such as a cell site and associated shelter. An objective of the battery security systems and methods is to deter/prevent battery theft.

Also, in various embodiments, the present disclosure relates to battery handling systems and methods for telecommunication sites, such as cell sites. Specifically, the systems and methods provide handling of hazardous or Environmental, Health, and Safety (EH&S) condition batteries. The EH&S condition batteries can be damaged, cracked, swollen, or leaking and are typically called out for immediate removal from a site.

Also, in various embodiments, the present disclosure relates to de-celling batteries for installation in telecommunication sites, such as cell sites. As described herein, de-celling includes separating individual battery cells from a manufacturer for transport to and installation at an associated site. The individual cells of a battery are easier to handle and install. The de-celling of batteries can be utilized with the battery recycling systems and methods, the security screws, and the battery installation improvement apparatus and method also described herein.

Also, in various embodiments, the present disclosure relates to cell site audit and inspection systems and methods related to battery and equipment connections. Specifically, paint or the like is utilized in a line across a connection once the connection is properly torqued. The torque marks can be verified as part of close-out audits following any installation or maintenance work and then verified over time including remotely via virtual site surveys.

Also, in various embodiments, the present disclosure relates to battery recycling systems and methods such as with respect to cell sites. Specifically, the battery recycling systems and methods provide an efficient, safe, and verifiable approach to recycling batteries. The systems and methods track used (spent) batteries from the deinstallation process at a cell site through final recycling evidenced by a recycling certificate. The systems and methods include various tracking techniques such as implemented through mobile devices and cloud systems.

Also, in various embodiments, the present disclosure relates to a battery installation with security screws for theft deterrence in cell site shelters and the like. Specifically, the battery installation utilizes security screws in various configurations for anchoring and securing batteries on site, such as at a cell site. Further, a method of installation is also described. The security screws require a specialized bit or tool for locking and tightening. Batteries can be anchored to terminal plates with the security screws. Further, the batteries can be locked together with one another forming a single unit, increasing the weight and bulk of the single unit presenting significant challenges to remove the batteries. Even further, brackets can be used with the security screws to attach the batteries to a shelf, cabinet, etc.

Also, in various embodiments, the present disclosure relates to a battery installation improvement apparatus and method in cell site shelters and the like. The apparatus includes an adjustable rack dimensioned to fit into small telecom cabinets or shelters and used to remove old batteries and install new batteries quickly (i.e., multiple batteries at a time) and efficiently (i.e., less labor required). The adjustable rack includes omnidirectional wheels and can be maneuvered/positioned in the shelter adjacent to a battery system. The adjustable rack includes adjustable shelves which can be positioned adjacent to old batteries for removal thereof, the apparatus can be wheeled out of the shelter to remove the old batteries, new batteries can be placed on the adjustable shelves, which can be positioned at appropriate heights based on the removal, and the apparatus can be maneuvered/positioned back to the battery system where the new batteries are provided. Advantageously, the apparatus can be used by a single installer, more than doubling the efficiency in removing/installing batteries. Also, in an embodiment, the apparatus can be used in conjunction with the security screws and installation approach.

§ 1.0 Example Cell Site

Referring to FIG. 1, in an embodiment, a diagram illustrates a side view of an example cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lighting rod 16, a warning light 18, etc. Of course, there may various additional components associated with the cell tower 12 and the cell site 10 which are omitted for illustration purposes. In this embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g., there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

To support the various cell site components and their operation thereof, the cell site 10 includes a shelter 50 (which can also be referred to as a cabinet, house, etc.) which include electronics and other networking equipment to support the functionality and operation. The shelter 50 can include a battery system which supports power for the various equipment at the cell site 10 when a primary power source is unavailable. The present disclosure relates to an apparatus and method for improving installation efficiency of individual batteries in the battery system. The apparatus and method are illustrated herein referencing the cell site 10 and the shelter 50, but those of ordinary skill in the art will recognize other applications are also contemplated in the telecom and data communications space.

§ 2.0 Example Shelter

Figure 2:
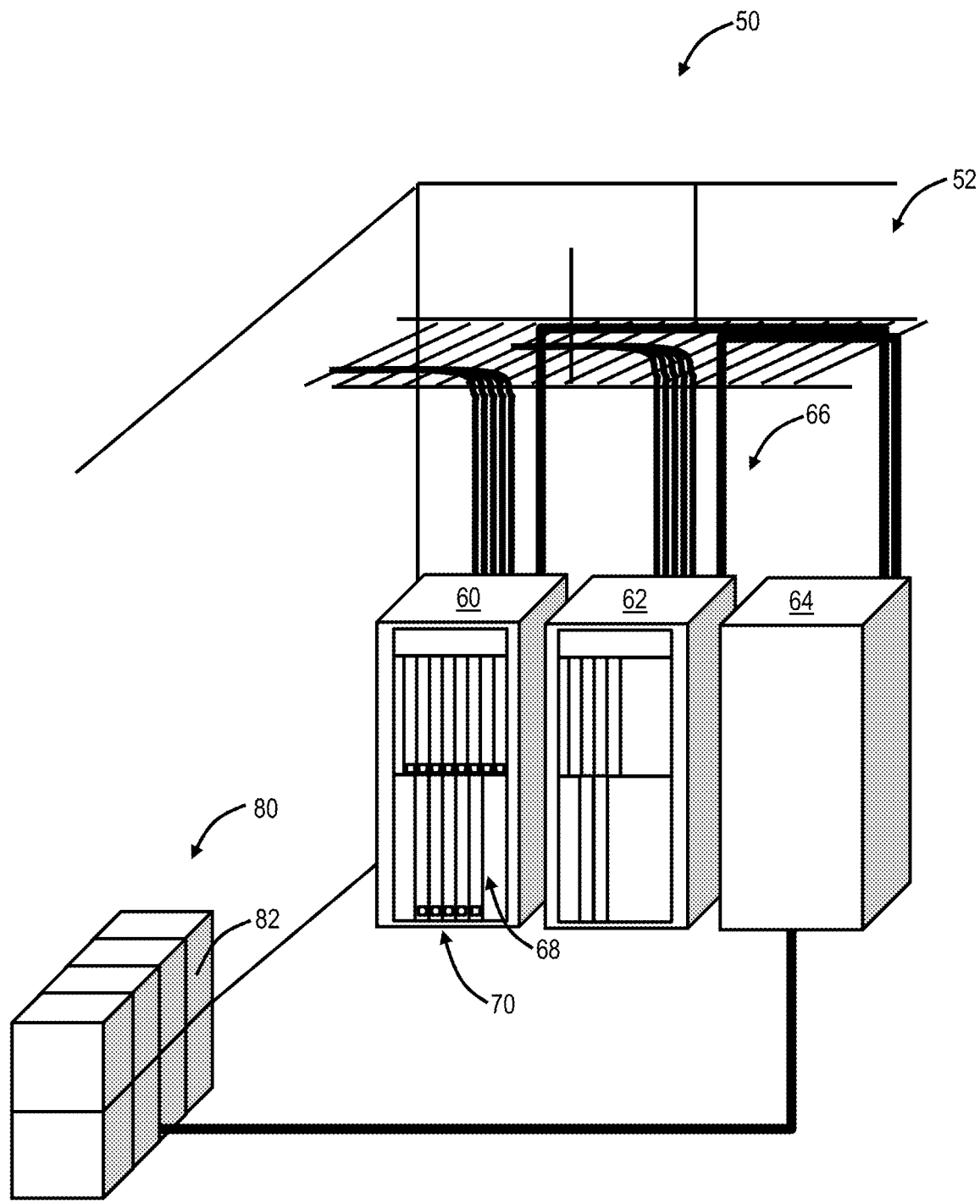
FIG. 2 is a diagram of an example interior of a shelter at the cell site.

Referring to FIG. 2, in an embodiment, a diagram illustrates an interior 52 of a shelter 50 at the cell site 10. Generally, the shelter 50 houses equipment associated with the cell site 10 such as wireless RF terminals 60 (e.g., LTE terminals), wireless backhaul equipment 62, power distribution 64, and the like. Generally, wireless RF terminals 60 connect to the cell site components 14 for providing associated wireless service. The wireless backhaul equipment 62 includes networking equipment to bring the associated wireless service signals to a wireline network, such as via fiber optics or the like. The power distribution 64 provides power for all of the equipment such as from the grid as well as a battery backup to enable operation in the event of power failures. Of course, additional equipment and functionality are contemplated in the interior 52. The terminals 60, equipment 62, and the power distribution 64 can be realized as rack or frame mounted hardware with cabling 66 and with associated modules 68. The modules 68 can be pluggable modules which are selectively inserted in the hardware and each can include unique identifiers 70 such as barcodes, Quick Response (QR) codes, RF Identification (RFID), physical labeling, color coding, or the like. Each module 918 can be unique with a serial number, part number, and/or functional identifier. The modules 68 are configured as needed to provide the associated functionality of the cell site.

The power distribution 64 can receive power from a primary source which is typically a local power provider. To support resiliency and redundancy when the primary source is unavailable, e.g., during a power outage, the shelter 50 can include a battery system 80 which can also be coupled to the power distribution 64. The present disclosure relates to an apparatus which is maneuverable in the shelter 50 to remove/install batteries in the battery system 80.

§ 3.0 Battery System for a Shelter or the Like

Figure 3:
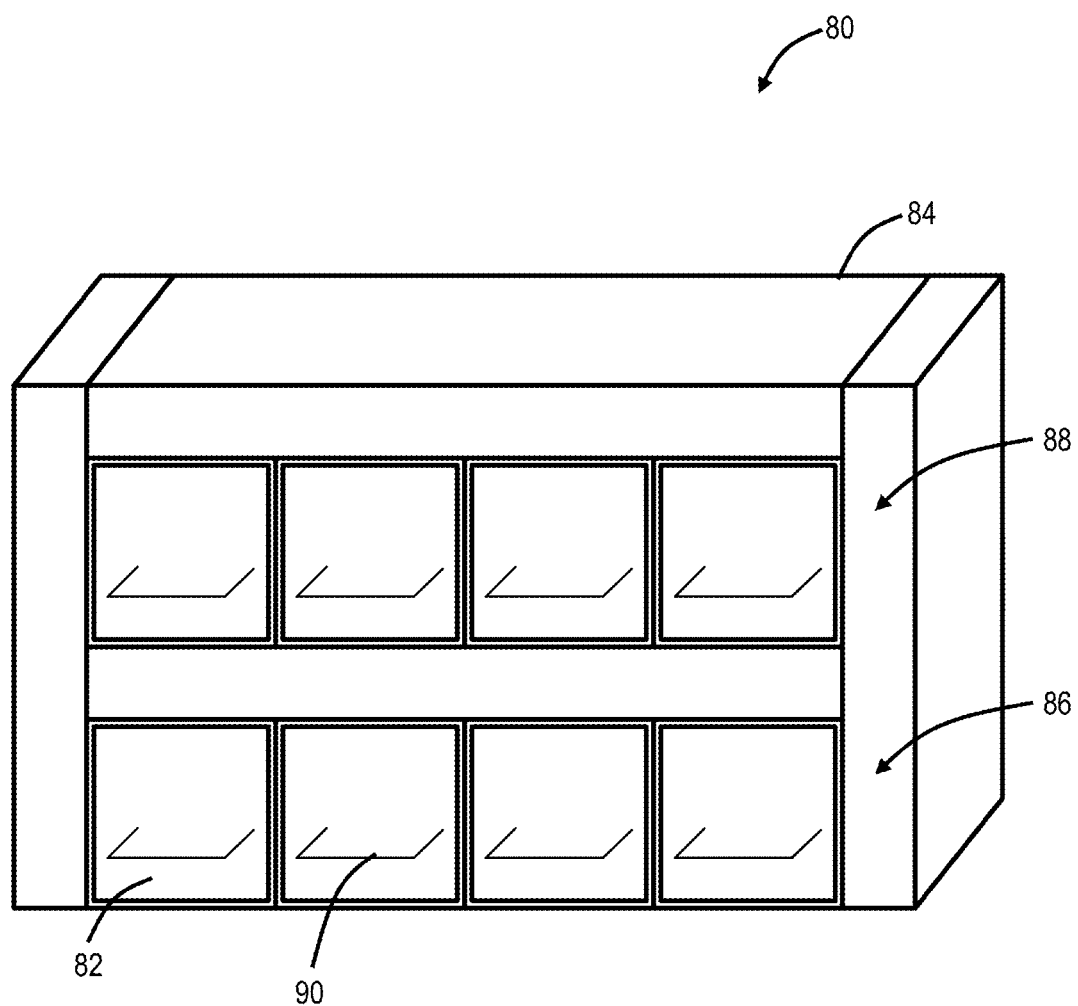
FIG. 3 is a block diagram of an example battery system.

Referring to FIG. 3, in an embodiment, a block diagram illustrates an example battery system 80. The battery system 80 can include N batteries 82, N being an integer such as 4, 8, 16, 48, etc. (N=8 in the example of FIG. 3). The number of batteries 82 is selected based on the amount of equipment associated with the cell site 10 and the amount of backup time desired. Typically, the number of batteries is 4 or more. The battery system 80 can include a housing 84, such as a frame, rack, etc. with openings for each of the batteries 82. For example, the housing 84 can have a rectangular shape with rows 86, 88 of the batteries 82 at various heights. The example of FIG. 3 includes two rows 86, 88, but other embodiments are also contemplated such as a single row, more than two rows, etc.

The batteries 82 can be selectively plugged/unplugged into the housing 84 of the battery system 80. The housing 84 supports connectivity between the batteries 82 and to the power distribution 64 as well as monitoring of the batteries 82. In other embodiments, the battery system 80 can omit the housing 84 where the batteries 82 are directly connected to one another and supported, for example, by shelves or simply placed on the ground and on top of one another. The batteries 82 can include a handle 90 or the like for an installer to handle physically.

§ 4.0 Battery Installation Apparatus

Figure 4:
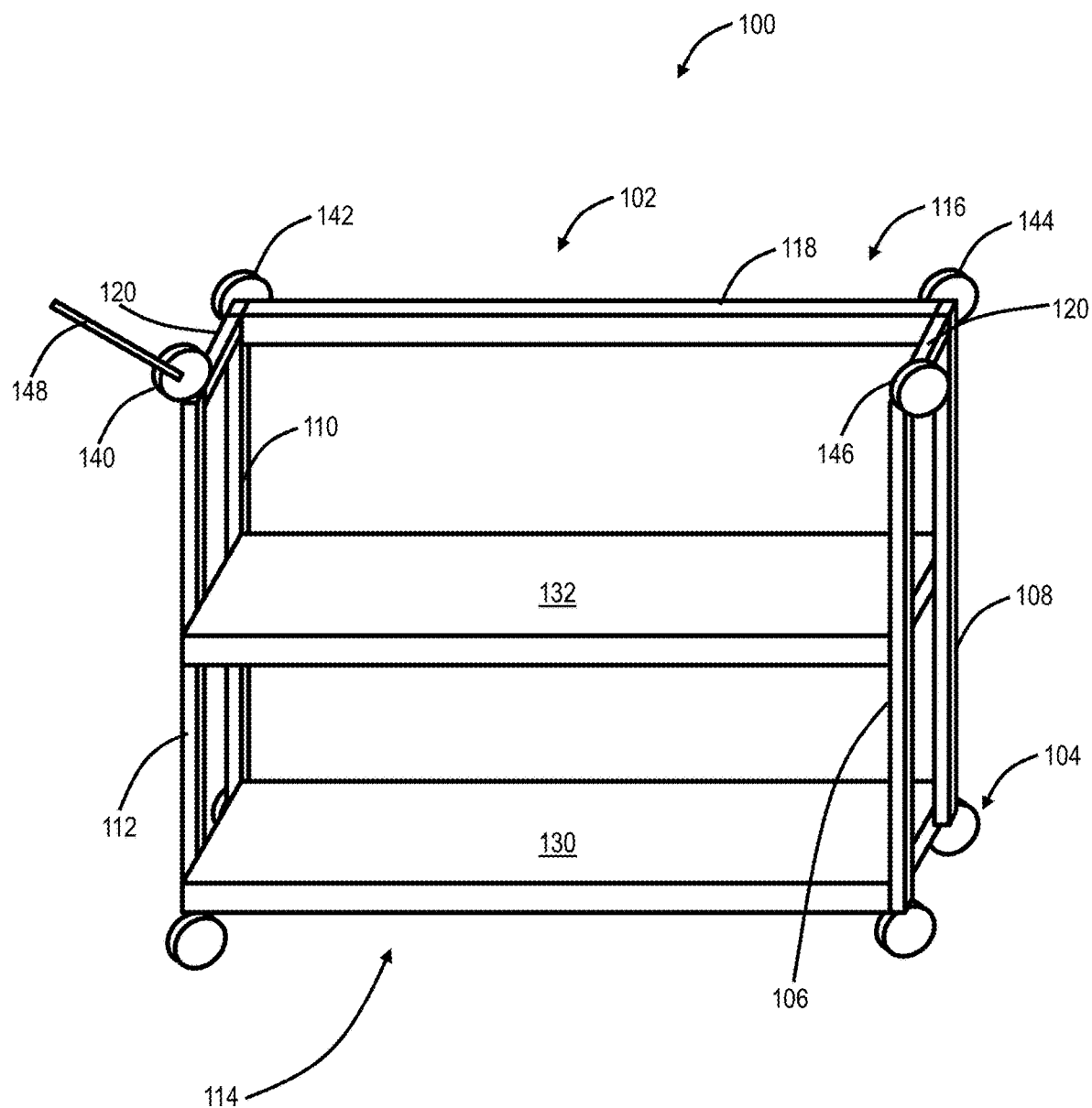
FIG. 4 is a diagram of a battery installation apparatus for assisting in the removal and installation of the batteries in the shelter.

Referring to FIG. 4, in an embodiment, a diagram illustrates a battery installation apparatus 100 for assisting in the removal and installation of the batteries 82 in the shelter 50. The battery installation apparatus 100 is a maneuverable frame 102 with omnidirectional wheels 104. Specifically, the frame 102 can include four vertical support posts 106, 108, 110, 112 each connected to one of the omnidirectional wheels 104. The shape of the frame 102 is generally rectangular, similar to the battery system 80. A front side 114 of the frame is open, and a rear side 116 includes support bars 118 connected between the posts 108, 110. The sides of the frame 102 include support bars 120 between the posts 110, 112 and the posts 106, 108.

The apparatus 100 can include a fixed bottom shelf 130 connected or disposed to the posts 106, 108, 110, 112. The apparatus 100 can also include a moveable shelf 132. The moveable shelf 132 is adjustable based on four pulleys 140, 142, 144, 146. The pulley 140 includes a handle 148 that is adapted to rotate to move a rope or other winch type mechanism which is connected to the other pulleys 142, 144, 146 as well. Movement of the handle 148 causes the moveable shelf 132 to move vertically evenly in either direction (based on the rotation direction of the handle 148). When the handle 148 is stationary, the moveable shelf 132 remains fixed in place.

The shelves 130, 132 are configured to support the batteries 82. Specifically, the apparatus 100 is dimensioned to support the N batteries 82, sort of like a mobile battery system 80. The moveable shelf 132 is vertically adjusted to match the height of the second row of the batteries 82 in the battery system 80.

In an embodiment, a battery installation apparatus for installing and removing batteries in a shelter or cabinet includes a frame comprising four posts, wherein the frame is dimensioned to maneuver in the shelter or cabinet; a lower shelf fixed to the frame; an upper shelf moveable on the frame, wherein each of the lower shelf and the upper shelf are dimensioned to support the batteries; and omnidirectional wheels disposed to each of the four posts.

To install the batteries, a plurality of batteries are placed on the lower shelf and the upper shelf; the frame is moved into the shelter or cabinet to a location proximate and adjacent to a battery system in the shelter or cabinet; the upper shelf is adjusted based on the battery system; and each of the plurality of batteries is moved to the battery system. To remove the batteries, the frame is moved into the shelter or cabinet to a location proximate and adjacent to a battery system in the shelter or cabinet; old batteries from the battery system are placed on the upper shelf and the lower shelf; the frame is moved out of the shelter or cabinet; and the old batteries are removed.

The frame can be dimensioned based on a size of the battery system and a size of the shelter or cabinet. The battery installation apparatus can further include a pulley system coupled to the four posts to raise and lower a shelf of the shelves vertically. The pulley system can include a handle which is rotated to move the upper shelf and which holds the upper shelf when the handle is stationary. The battery installation apparatus can include a rectangular shape. The plurality of batteries can include N batteries, N=4, 8, 16, 24, or 48. The battery installation apparatus can be operated by a single installer. The shelter or cabinet can be at a cell site.

§ 5.0 Battery Installation Method

Figure 5:
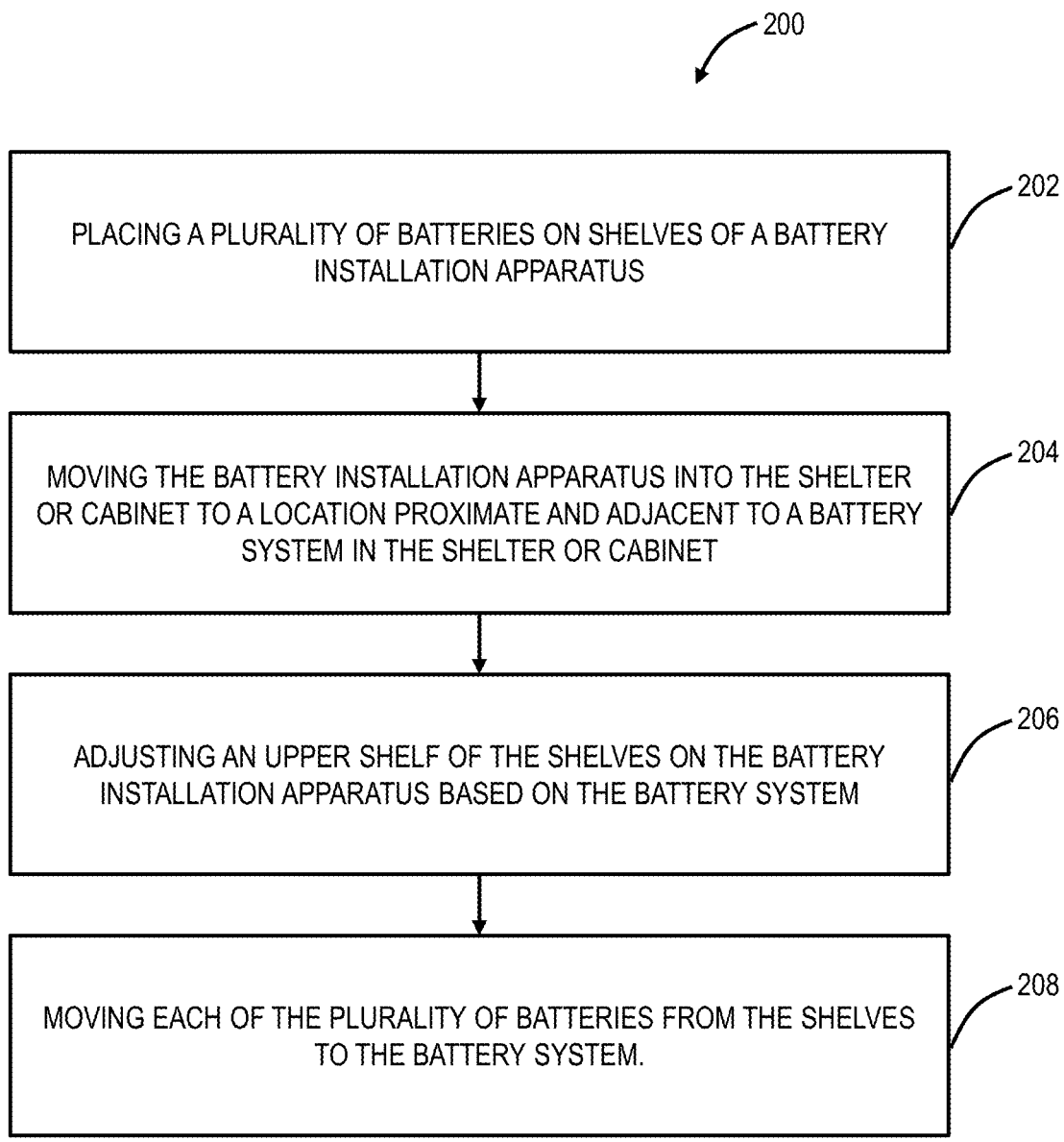
FIG. 5 is a flowchart of a battery installation method for assisting in the removal and installation of the batteries in the shelter using the battery installation apparatus.

Referring to FIG. 5, in an embodiment, a flowchart illustrates a battery installation method 200 for assisting in the removal and installation of the batteries 82 in the shelter 50 using the battery installation apparatus 100. The battery installation method 200 includes placing a plurality of batteries on shelves of a battery installation apparatus (step 202); moving the battery installation apparatus into the shelter or cabinet to a location proximate and adjacent to a battery system in the shelter or cabinet (step 204); adjusting an upper shelf of the shelves on the battery installation apparatus based on the battery system (step 206); and moving each of the plurality of batteries from the shelves to the battery system (step 208). The battery installation method can further include, prior to step 202, moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The plurality of batteries can include N batteries, N=4, 8, 16, 24, or 48. The method 200 can be performed by a single installer. The shelter or cabinet can be at a cell site.

§ 6.0 Security Screws for Battery Installation

Figure 6:
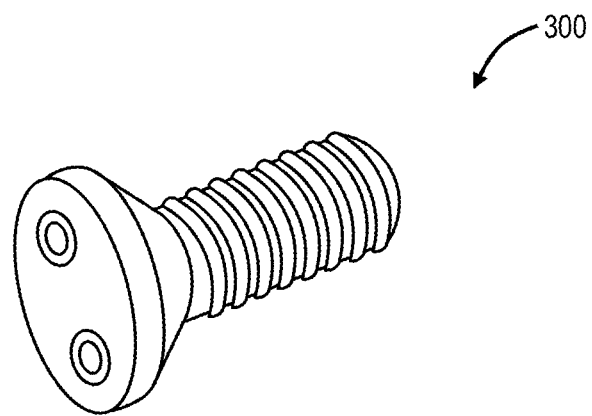
FIG. 6 is a diagram of an example of a security screw.

Referring to FIG. 6, in an embodiment, a diagram illustrates an example of a security screw 300. As described herein, the security screw 300 and other security screws have unique designs that make them virtually impossible to remove without specialized tools. The security screws can be referred to as tamper proof, tamper resistant, etc. The systems and methods described herein contemplate the use of any type of security screw. Common examples of tamper resistant screws are one-way screws, spanner screws, and a tamper-resistant Allen-head screw with a protruding pin keeping regular Allen wrenches from working. A one-way screw has counter-clockwise ramps in the screw's head. A screw-driver turned clockwise engages the screw-head and forces it to rotate, but a screw-driver turned counter-clockwise slides up the ramps and accomplishes nothing. The intention is that the screws can be installed with a standard screw-driver but cannot be easily removed without a special removal tool that digs into the ramps to get a good grip.

A spanner screw has two small holes drilled in its head and is designed to be installed and removed with a special spanner screw-driver. The security screw 300 is an example of a spanner screw. A tamper-resistant Allen-head screw is designed to be removed only with a specially modified Allen wrench having a small hole drilled in its end to accept the protruding pin in the head of the screw. Also, the security screws can have unique, proprietary designs making them more tamper resistant than off-the-shelf variants such as the spanner screw. Again, the systems and methods described herein contemplate the use of any type of security screw.

Figure 7:
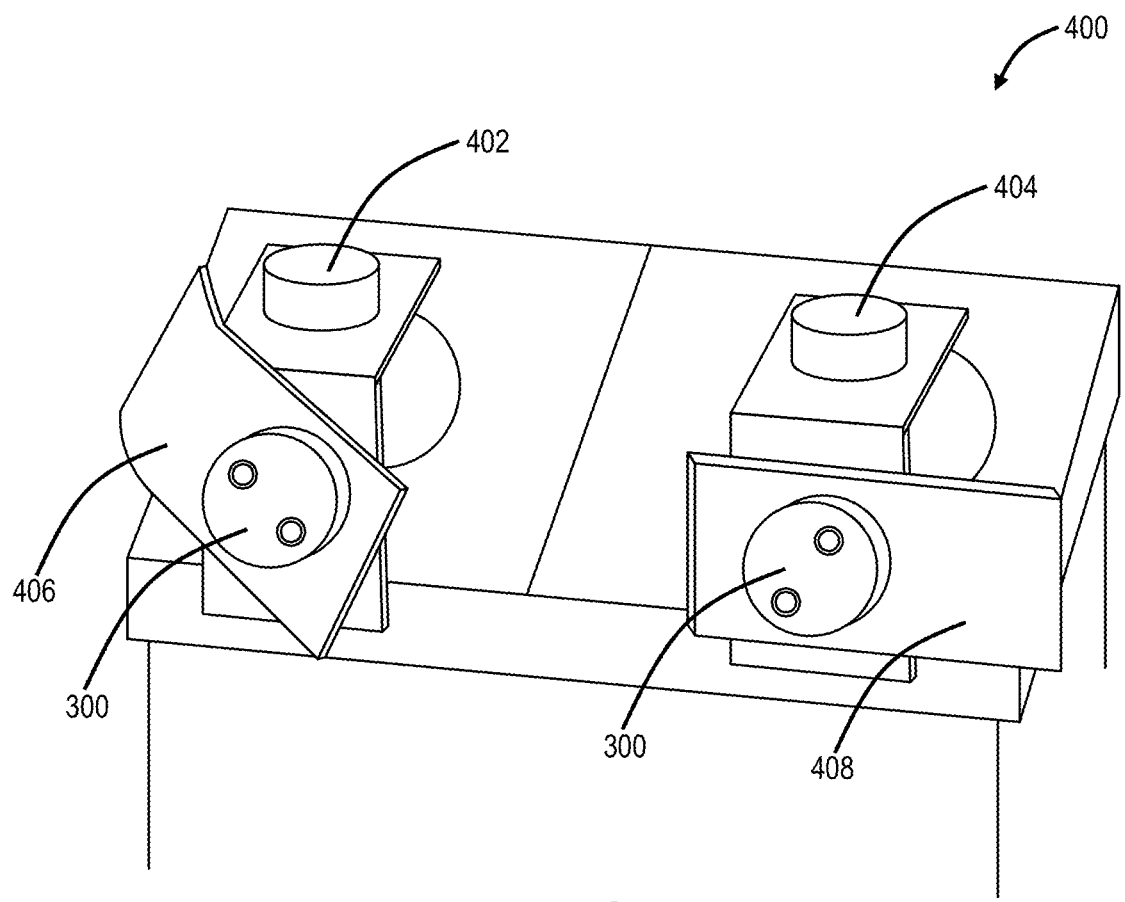
FIG. 7 is a diagram of a battery with security screws attaching terminals to terminal plates.

Referring to FIG. 7, in an embodiment, a diagram illustrates a battery 400 with security screws 300 attaching terminals 402, 404 to terminal plates 406, 408. The battery 400 can be square or rectangular shaped, and the battery 400 can be positioned and installed with the battery installation apparatus 100. The battery 400 includes terminals 402, 404 (e.g., a positive and a negative terminal) which need to be connected to corresponding leads (not shown) to connect the battery 400. Note, the battery 400 can be connected in various ways (e.g., series, parallel, etc.) with other batteries. The terminals 402, 404 are connected to terminal plates 406, 408 respectively and the terminal plates 406, 408 are ultimately connected to the leads. This connection is both a physical connection, locking the battery 400 in place, and an electrical connection.

In the systems and methods, the terminals 402, 404 are physically connected to the terminal plates 406, 408 using the security screws 300 (or any variant of security, tamper proof, or tamper resistant screw). The security screws 300 are used in lieu of conventional screws. On-site installation personnel is equipped with an associated unique tool to fasten and tighten the security screws 300 physically connecting the terminals 402, 404 with the terminal plates 406, 408. Note, the terminal plates 406, 408 can also be connected at an opposite end via the security screws 300. The security screws 300 have minimal increased cost from conventional screws and add little to no additional installation time. At the same time, the security screws 300 advantageously lock the battery 400 in place, minimizing the risk of theft. That is, once installed, the battery 400 is physically locked and cannot be undone without the unique tool.

Also, paint can be applied to the security screw 300, the terminals 402, 404, and the terminal plates 406, 408 after the security screw 300 is tightened. The paint is for quality control, to show that the steps have been taken to appropriately tighten the security screw 300 (to the specified torque)—assumption is made that if someone takes the trouble to apply the paint, they have appropriately tightened the screw. And, if the paint is applied and dries in place on a tightened security screw 300 and then is found to be broken, the security screw 300 is no longer tight—an easy visual confirmation of appropriately tightened connections.

Figure 8:
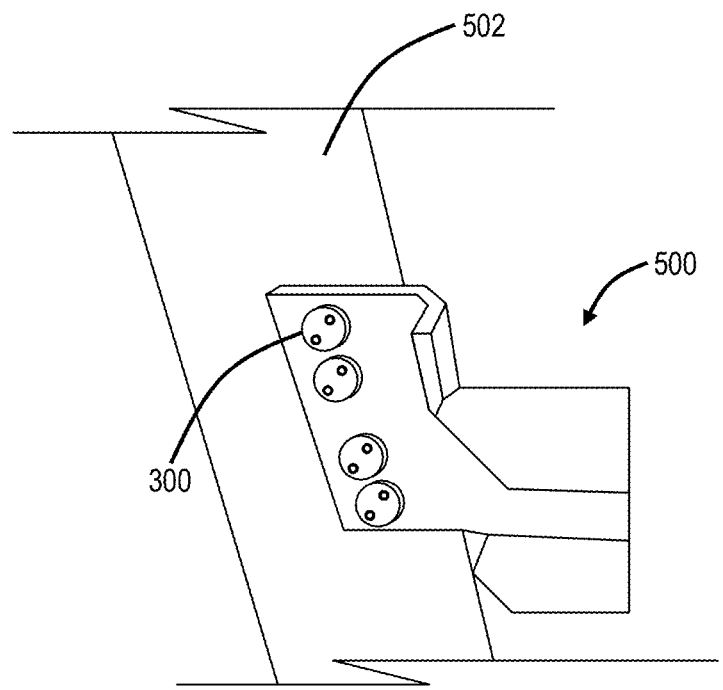
FIGS. 8 and 9 are diagrams of a bracket fastened to a housing via the security screws.
Figure 9:
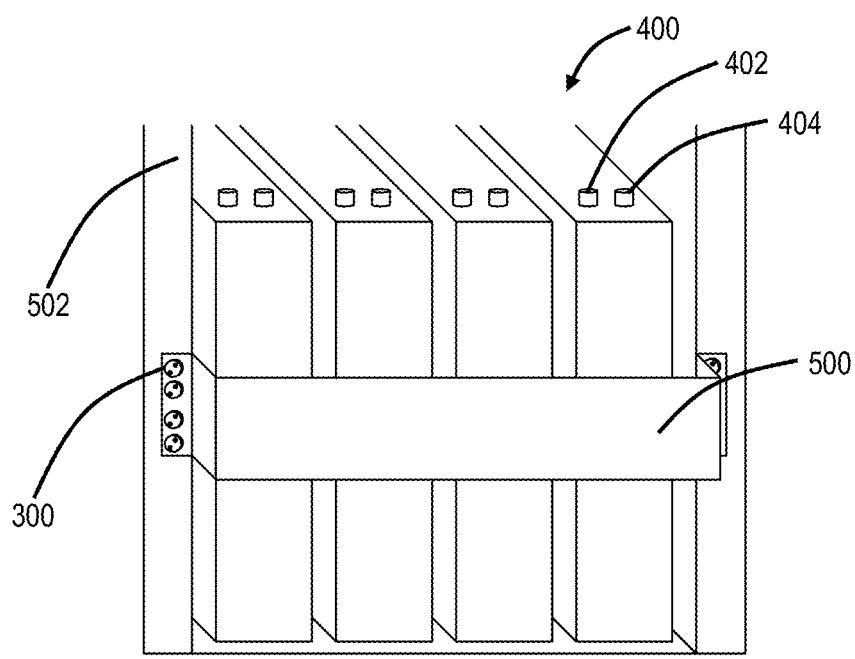
Figure 10:
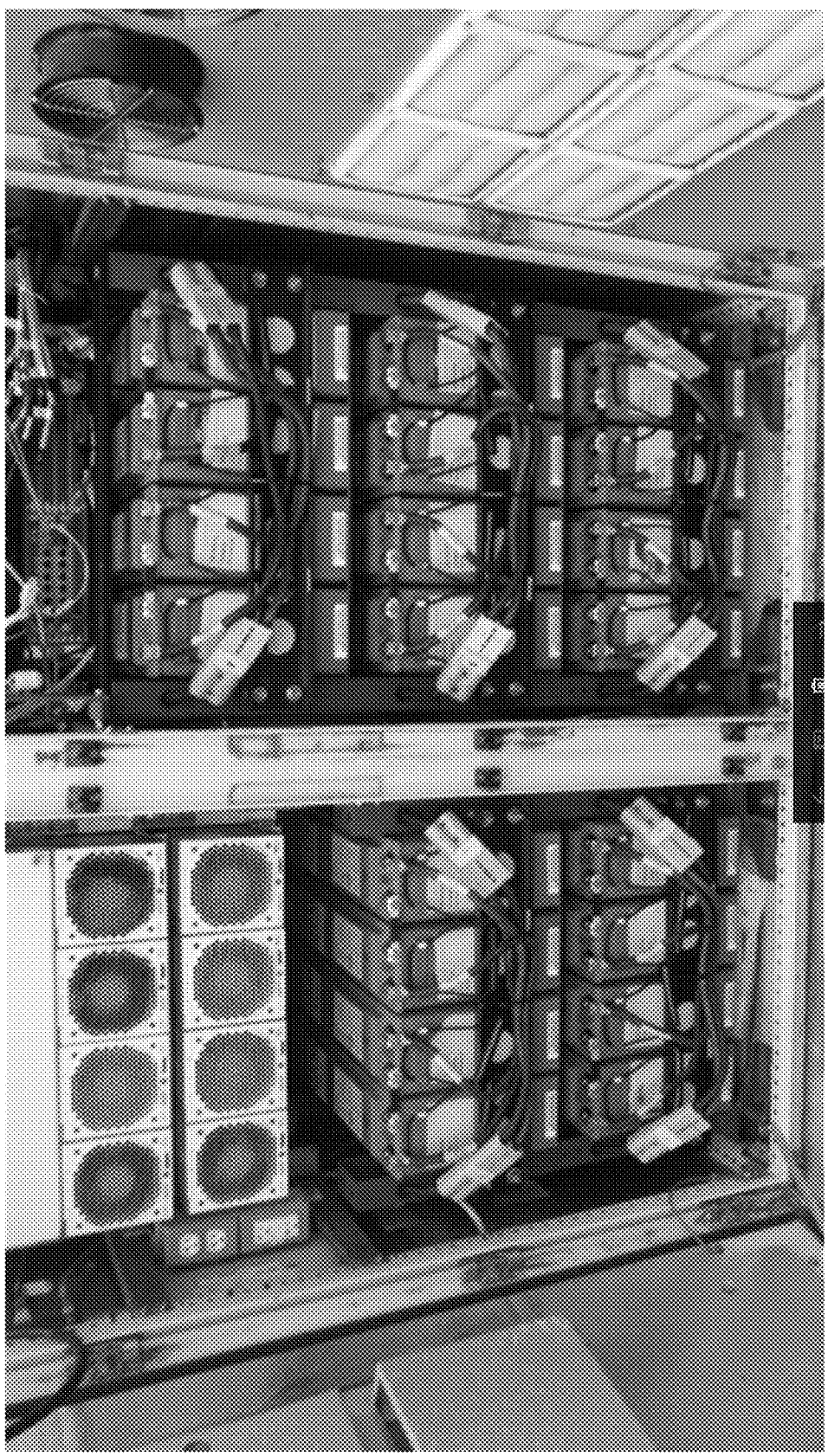
FIG. 10 is a diagram of batteries installed in an outside plant cabinet.

Referring to FIGS. 8 and 9, in an embodiment, diagrams illustrate a bracket 500 fastened to a housing 502 via the security screws 300. The bracket 500 can be used in conjunction with the security screws 300 between the terminals 402, 404 and the terminal plates 406, 408. The bracket 500 locks the batteries 400 together to a structure, i.e., the housing 502. For example, the housing 502 can be part of a cabinet or the like. FIG. 10 illustrates the batteries 400 installed in an outside plant cabinet. The bracket 500 locks the batteries 400 together as a single unit and provides protection from removal. The bracket 500 can also hold the batteries 400 in place.

Figure 11:
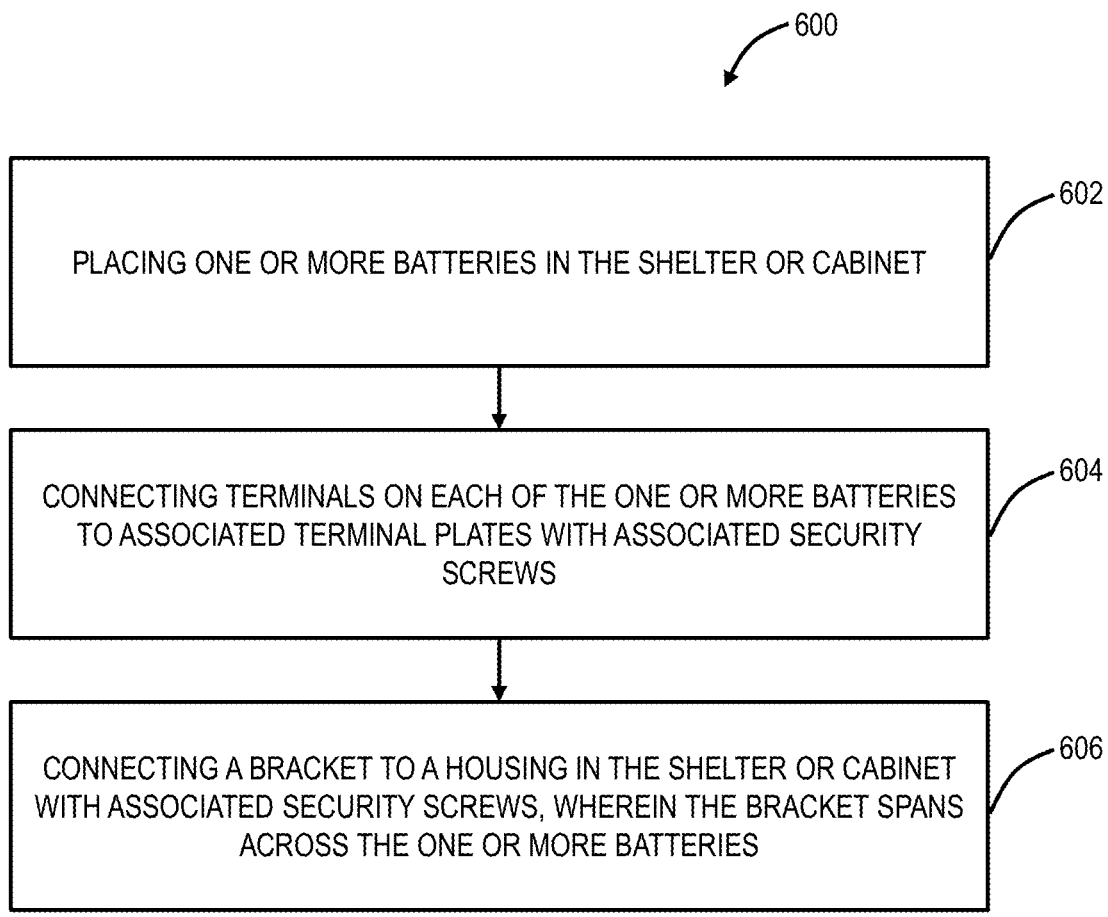

Referring to FIG. 11, in an embodiment, a flowchart illustrates a battery installation method 600 with security screws for theft deterrence in cell site shelters and the like. The battery installation method 600 includes placing one or more batteries in the shelter or cabinet (step 602); connecting terminals on each of the one or more batteries to associated terminal plates with associated security screws (step 604); and connecting a bracket to a housing in the shelter or cabinet with associated security screws, wherein the bracket spans across the one or more batteries (step 606). The security screws are installed with a unique tool specially designed for the associated security screws to deter tampering. The security screws can include spanner screws, one-way screws, or tamper-resistant Allen-head screws each with a protruding pin. The security screws can include uniquely designed screw heads with a corresponding unique tool.

The placing step 602 can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system. The battery installation method 600 can further include moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The one or more batteries can include N batteries, N=4, 8, 16, 24, or 48. The battery installation method 600 can be performed by a single installer. The shelter or cabinet is at a cell site.

§ 7.0 Used Battery Handling and Recycling

Figure 12:
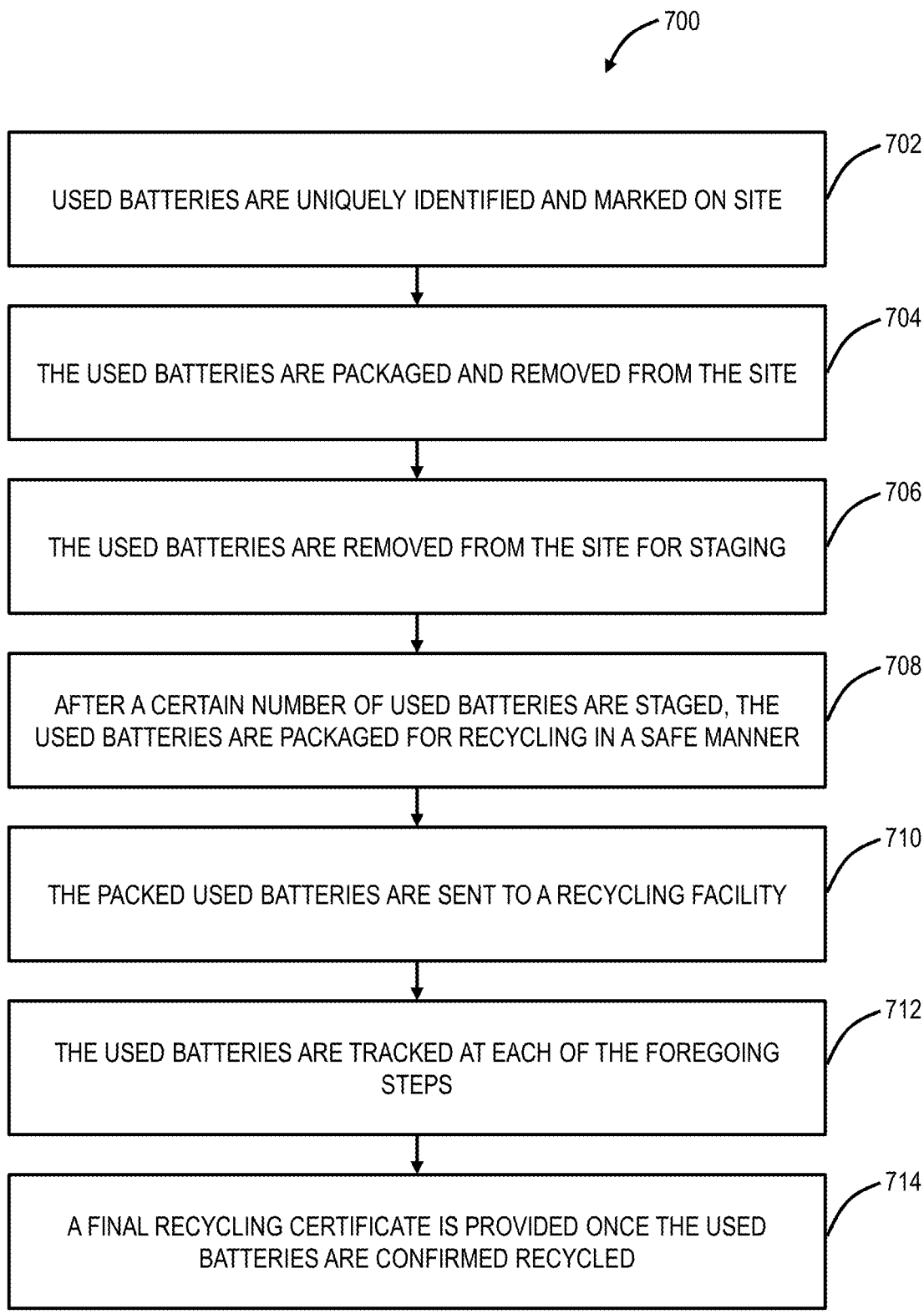
FIG. 12 is a flowchart illustrates a battery recycling method.

Referring to FIG. 12, in an embodiment, a flowchart illustrates a battery recycling method 700. The battery recycling method 700 is implemented at one or more of the cell sites 10 and a staging location (e.g., a warehouse, etc.) and can utilize the battery installation apparatus 100 and/or the security screws 300. Again, objectives of the battery recycling method 700 include i) safety—ensuring the used batteries are properly removed, stored, and transported, ii) efficiency—dealing with multiple cell sites 10 efficiently, and iii) compliance—ensuring the batteries are properly recycled.

The battery recycling method 700 initiates on site with uniquely identifying and marking used batteries (step 702). Specifically, step 702 includes arriving on site such as at the cell site 10 and identifying the used batteries 82. The used batteries 82 can be uniquely identified or tagged as they are removed from the cell site 10. For example, the battery recycling method 700 can include the use of a mobile device 800 which is used to track the used batteries 82 electronically. The mobile device 800 can execute an application or browser to communicate/store data on a back-end server or in the cloud related to the uniquely identified and marked batteries 82. For example, a technician assisting in performing the battery recycling method 700 can note the quantity, make, model, etc. of the used batteries via the mobile device 800 and the mobile device 800 can provide this data to the back-end server or the cloud for tracking and compliance. For example, once the data is input in step 702, the technician can confirm prior to, concurrent with, or subsequent to the removal of the batteries 82 for transport from the cell site 10 to a warehouse/temporary staging facility.

Also, as part of the uniquely identifying and marking used batteries, a certificate of recycling can be generated stating that the company performing the battery recycling method 700 has taken ownership of the used batteries 82 along with language that confirms the battery recycling method 700 will be followed and performed to comply with applicable regulations (e.g., Environmental Protection Agency (EPA) guidelines, etc.). The certificate of recycling can also identify the recycling facility, etc. and the purpose of the certificate of recycling is to allow the cell site 10 operator assurances regarding proper procedures and transfer of liability. Again, the certificate of recycling can be electronic, through the back-end server or the cloud.

The used batteries 82 are packaged and removed from the cell site 10 (step 704). The used batteries 82 can be any size, e.g., 12V which is about 2-3 times the size of a typical car battery, or the like. For example, the removal of the used batteries 82 can utilize the battery installation apparatus 100 to efficiently remove the batteries 82 from the cell site 10. The used batteries 82 are packaged such as placed on pallets or the like and removed from the cell site 10 for staging, such as at the warehouse/temporary staging facility (step 706). The battery recycling method 700 contemplates the technician or multiple technicians visiting one or more cell sites 10 and performing steps 702, 704 at the cell site 10 and step 706 as a transportation step between the cell site 10 and the warehouse/temporary staging facility. For example, multiple cell sites 10 can be visited for removing batteries 82 before returning to the warehouse/temporary staging facility.

At the warehouse/temporary staging facility, after a certain number of used batteries 82 have been staged, the used batteries 82 are packaged for recycling in a safe manner (step 708). The safe manner includes various steps and packaging to ensure the used batteries 82 can be safely transported to the recycling facility. For example, the packaging must include insulation to protect battery leads from touching metal or the like during transport. The packaging can include a cardboard or wooden box with form fitting slots for each battery 82, and the box can sit on a pallet. Alternatively, the batteries 82 can be directly placed on a pallet such as with an empty sheet of cardboard (or wood or other suitable insulating material) placed on top of the empty pallet. The sheet of cardboard can include markings with lines and with identifiers. The technicians can place each battery 82 on an empty space based on the markings. Also, the associated identifier can be noted, such as through the mobile device 800. For example, battery X which was uniquely identified at cell site A was placed on pallet N in space 1. That is, during the lifecycle of the battery recycling method 700, each time the battery 82 is moved or packaged, this can be noted via the mobile device 800.

Figure 13:
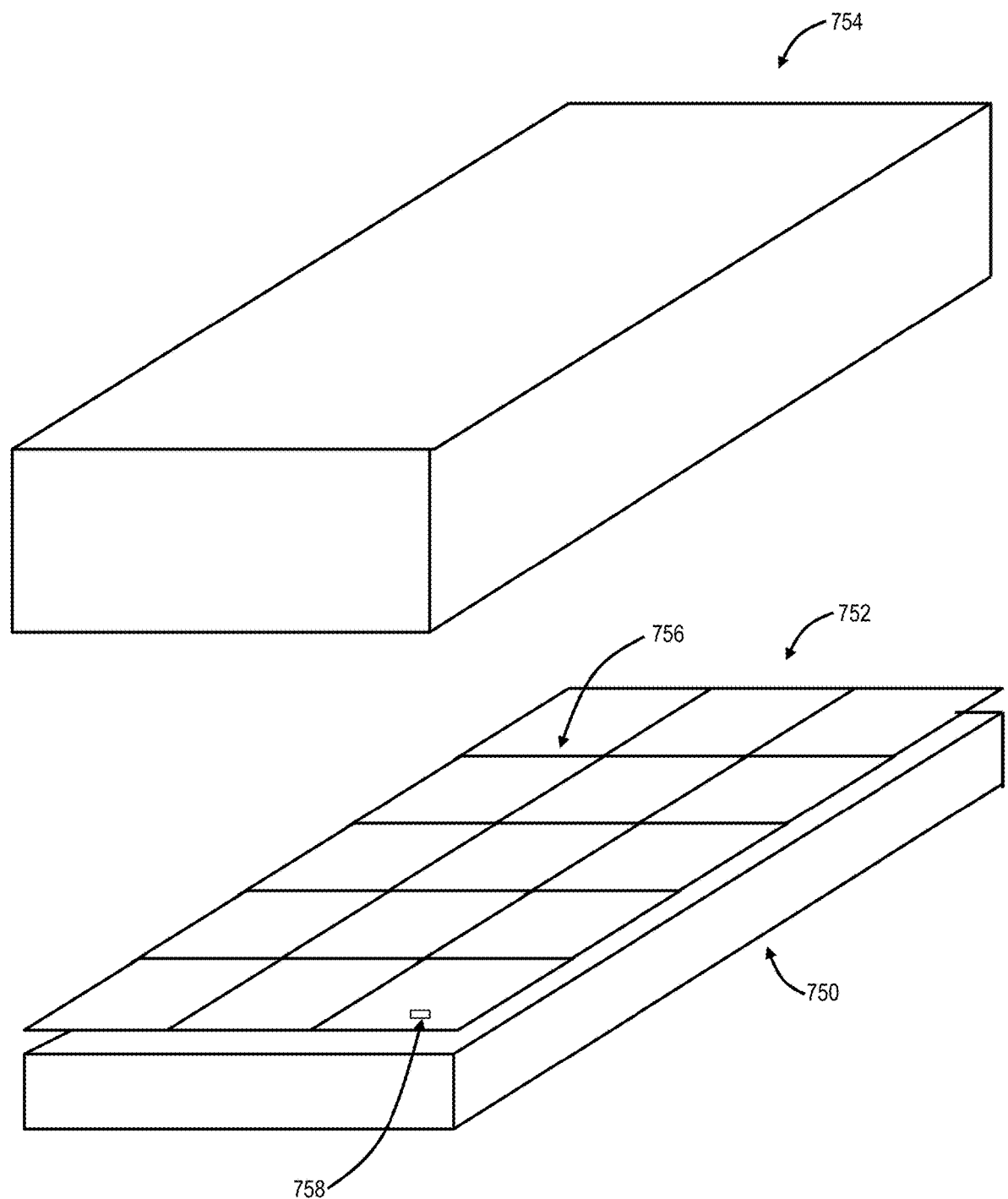
FIG. 13 is a perspective diagram of a pallet, an insulation sheet, and a top sheet without batteries for use in the battery recycling method of FIG. 12.

FIG. 13 is a perspective diagram of a pallet 750, an insulation sheet 752, and a top sheet 754 without the batteries 82. The pallet 750 can be wooden, metal, plastic, etc. and configured to be picked up by a forklift or the like. The insulation sheet 752 can be the empty sheet of cardboard (or wood or other suitable insulating material) placed on top of the empty pallet 750. The insulation sheet 752 includes lines 756 showing where to place each battery 82, and each box can include a unique label 758 for identifying a location of each battery 82 for tracking. Note, the mobile device 800 is described later, and those skilled in the art will recognize that the tracking at each step can take various approaches including manual data entry, photos, bar code scanning, RFID, etc.

Once a complete layer of batteries 82 is placed on the pallet 750 or in the box, another sheet of cardboard (or wood or other suitable insulating material) is placed on top of the batteries 82. Further, each of the batteries 82 can have a tape or similar adhesive with insulating properties placed on the terminals to prevent contact or leaking during transport. The layering of the batteries 82 can be repeated until a certain height is achieved on the pallet 750, e.g., three rows. The top layer of batteries 82 can have another sheet of cardboard (or wood or other suitable insulating material) placed on top, and this can be referred to as a top sheet of cardboard, i.e., the top sheet 754. Similar to the insulation sheet 752, the top sheet 754 can include an empty sheet of cardboard (or wood or other suitable insulating material). Also, the top sheet 754 can have sides that extend beyond the outer edge of the top row of batteries 82.

Once the top sheet 754 is placed on a full pallet 750, the pallet 750 can be banded through the bottom of the pallet 750 and around the batteries 82 such as using a poly type material strapping to secure the load as a single unit that does not shift during transport. It is important to avoid any metal in strapping down the batteries 82 to avoid any contact with the used batteries 82. The pallet 750 can also be wrapped in shrink wrap or the like covering the outer edges of the top row of batteries 82 down to and including around the outside corner of the pallet 750.

The pallet 750 can be labeled with appropriate information including warnings such as non-combustible and other relevant information such as the site ID and quantity, make, a model of batteries and estimated weight for each pallet 750. The pallet 750 can also be labeled with number tracking, e.g., pallet 1 of 15, 2 of 15, etc.

With the label and the completely packed pallet 750, the battery recycling method 700 can include a verification step where a photo is taken of the pallet 750 including the label, and this photo can be uploaded to the back-end server or the cloud and correlated with each battery 82 being tracked. This photo can serve as a confirmation that the batteries 82 were packed and loaded on the pallet 750 and are ready to ship.

With packed pallets 750, the packed, used batteries 82 are sent to a recycling facility (step 710). For example, a Bill of Lading (BOL) can be prepared for shipment document the total number of pallets and estimated weight for shipment.

Importantly, the used batteries 82 are tracked at each step in the battery recycling method 700, such as using the mobile device 800 and the back-end server/cloud. Various reports can be generated including an inventory label sheet—an overall document created that shows batteries by pallet #, battery quantity, make & model and site origin. Also, this information can be accessible by the cell site owner 10 on demand, e.g., a process map which shows where the used batteries 82 are in the battery recycling method 700.

Once a final recycling certificate is received, the overall document is attached to verify the tracking of batteries at the individual level from removal to recycle (step 714). For example, the recycling certificate can be used for liability issues—battery X was found in a landfill, and there is a fine or the like—the cell site operator now has a document showing the liability resides with the operator of the battery recycling method 700.

The battery recycling method 700 can be adapted to different service providers, and the interface between the back-end server/cloud can be programmed to interface with back office systems for various service providers to automate various data exchanges. Also, the back-end server/ cloud can include scheduling applications such as to schedule pick ups, new battery installations, etc.

§ 8.0 Example Computing Device

Figure 14:
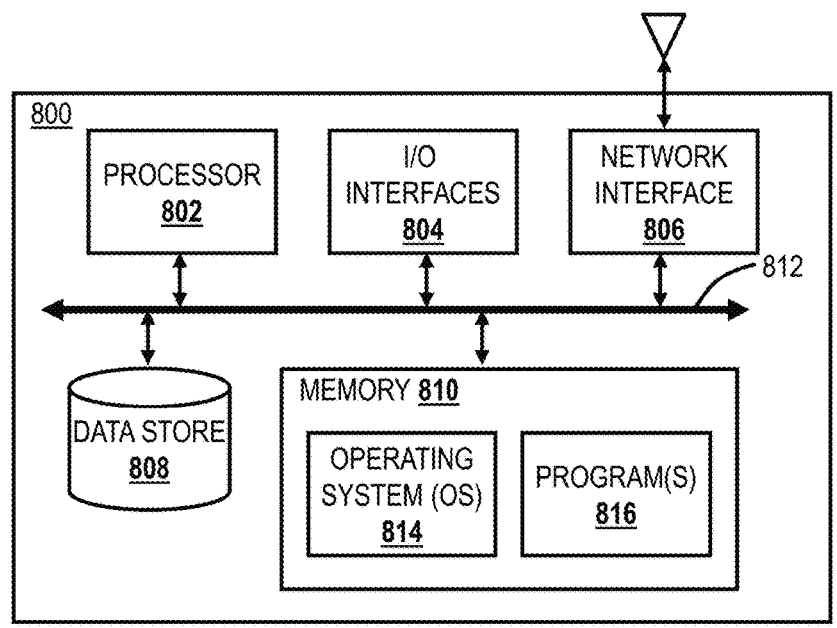
FIG. 14 is a block diagram illustrates a mobile device or general computing device, which may be used for the tracking aspects of the battery recycling method and the back-end server/cloud.

Referring to FIG. 14, in an embodiment, a block diagram illustrates a mobile device 800 or general computing device, which may be used for the tracking aspects of the battery recycling method 700 and the back-end server/cloud. The mobile device 800 can be a digital device that, in terms of hardware architecture, generally includes a processor 802, input/output (I/O) interfaces 804, a network interface 806, a data store 808, and memory 810. It should be appreciated by those of ordinary skill in the art that FIG. 14 depicts the mobile device 800 in an oversimplified manner, and a practical embodiment may include additional components and suitably configured processing logic to support known or conventional operating features that are not described in detail herein. The components (802, 804, 806, 808, and 802) are communicatively coupled via a local interface 812. The local interface 812 can be, for example, but not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 may include address, control, and/or data connections to enable appropriate communications among the aforementioned components.

The processor 802 is a hardware device for executing software instructions. The processor 802 can be any custom made or commercially available processor, a central processing unit (CPU), an auxiliary processor among several processors associated with the mobile device 800, a semiconductor-based microprocessor (in the form of a microchip or chip set), or generally any device for executing software instructions. When the mobile device 800 is in operation, the processor 802 is configured to execute software stored within the memory 810, to communicate data to and from the memory 810, and to generally control operations of the mobile device 800 pursuant to the software instructions. In an embodiment, the processor 802 may include a mobile-optimized processor such as optimized for power consumption and mobile applications. The I/O interfaces 804 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 804 can include a graphical user interface (GUI) that enables a user to interact with the mobile device 810. Additionally, the I/O interfaces 804 may further include an imaging device, i.e., camera, video camera, etc. used to obtain data such as from a barcode, Quick Response (QR) code, etc.

The network interface 806 enables wireless communication to an external access device or network. Any number of suitable wireless data communication protocols, techniques, or methodologies can be supported by the network interface 806, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. For the back-end server/cloud, the network interface 806 can include a wired network interface such as an Ethernet variant. The data store 808 may be used to store data. The data store 808 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 may incorporate electronic, magnetic, optical, and/or other types of storage media.

The memory 810 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 810 may incorporate electronic, magnetic, optical, and/or other types of storage media. Note that the memory 810 may have a distributed architecture, where various components are situated remotely from one another but can be accessed by the processor 802. The software in memory 810 can include one or more software programs, each of which includes an ordered listing of executable instructions for implementing logical functions. In the example of FIG. 14, the software in the memory 810 includes a suitable operating system (O/S) 814 and programs 816. The operating system 814 essentially controls the execution of other computer programs and provides scheduling, input-output control, file and data management, memory management, and communication control and related services. The programs 816 may include various applications, add-ons, etc. configured to provide end user functionality with the mobile device 800. For example, example programs 816 may include, but not limited to, a web browser, social networking applications, streaming media applications, games, mapping and location applications, electronic mail applications, and the like. In a typical example, the end user typically uses one or more of the programs 816 along with a network connection to the back-end server/cloud. The programs 816 can include a tracking app which is used during the battery recycling method 700.

§ 9.0 Cell Site Audit/Inspection/Site Survey

In general, a cell site audit (or site inspection, site survey, etc.) is performed to gather information and identify a state of the cell site 10. This is used to check the installation, maintenance, and/or operation of the cell site 10. Various aspects of the cell site audit can include, without limitation:

---

Verify the cell site 10 is built according to a current revision
Verify Equipment Labeling
Verify Coax Cable ("Coax") Bend Radius
Verify Coax Color Coding/Tagging
Check for Coax External Kinks & Dents
Verify Coax Ground Kits
Verify Coax Hanger/Support -continued Verify Coax Jumpers
Verify Coax Size
Check for Connector Stress & Distortion
Check for Connector Weatherproofing
Verify Correct Duplexers/Diplexers Installed
Verify Duplexer/Diplexer Mounting
Verify Duplexers/Diplexers Installed Correctly
Verify Fiber Paper
Verify Lacing & Tie Wraps
Check for Loose or Cross-Threaded Coax Connectors
Verify Return ("Ret") Cables
Verify Ret Connectors
Verify Ret Grounding
Verify Ret Installation
Verify Ret Lightning Protection Unit (LPI)
Check for Shelter/Cabinet Penetrations
Verify Surge Arrestor Installation/Grounding
Verify Site Cleanliness
Verify LTE GPS Antenna Installation

---

Of note, the cell site audit includes gathering information at and inside the shelter 50, on the cell tower 12, and at the cell site components 14. The cell site audit (site inspection, site survey, etc.) is used for various purposes including to verify proper installation, proper maintenance, and proper operation over time.

§ 9.1 Torque Mark to Verify Power and Equipment Connections

Figure 15:
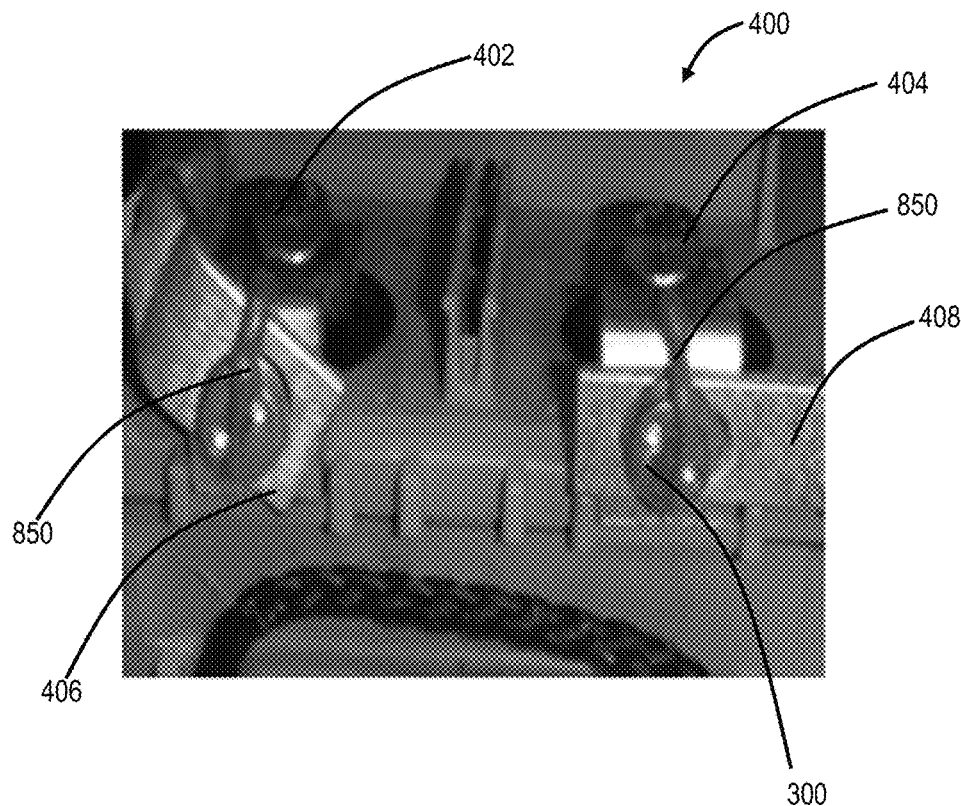
FIG. 15 is a picture of a torque mark on the connection between the terminals and the terminal plates for the battery.

It can be difficult to remotely verify connections such as battery connections, coax connections, etc. The systems and methods described herein provide a mechanism to visually and even remotely verify connection veracity merely by visual inspection. Referring to FIG. 15, in an embodiment, a picture illustrates a torque mark 850 on the connection between the terminals 402, 404 and the terminal plates 406, 608 for the battery 400. The torque mark 850 can be paint applied between the terminals 402, 404 and the terminal plates 406, 608 once the connections are appropriately torqued after installation. The torque mark 850, when initially made, visually indicates a quality connection. The torque mark 850 paint is any paint that will not negatively interact chemically with the battery 400, and thus fail, fade, etc. In an embodiment, the torque mark 850 paint is colored for easy visual inspection, such as red, yellow, or some other bright color. Of note, the color of the torque mark 850 paint should be distinct from the color of the underlying equipment (which is typically silver, gray, etc.). If the torque mark 850 is broken, it can visually be determined there is a problem with the connection.

While FIG. 15 illustrates the battery 400, those skilled in the art will recognize the torque mark 850 can be used on any connection, e.g., bolted connection in the shelter 50. For example, the torque mark 850 can be applied to racks/battery cases/power plants to show they have been appropriately anchored to the floor.

Also, the torque mark 850 contemplates any material or the like which can be physically attached to both ends of the connection and which would break or visually show signs of decay based on the connection losing torque. For example, the torque mark 850 can be paint, a marker, cellophane, tape, wax or wax-like compound, silicon, etc. Also, for ease of application, the material for the torque mark 850 can have an adhesive that is removed allowing for quick application. Alternatively, the material for the torque mark 850 can be dispensed through a dispensing apparatus.

The torque mark 850 can be applied across a top of the bolt in a line extending onto the surface of the object the bolt is connected to. If the bolt loosens, the torque mark 850 will break and/or fall off. Thus, simple visual inspection can confirm that the connections are still at the torque they were originally tightened to. Advantageously, the torque mark 850 as paint does not fade as a pen or marker would. Further, the torque mark 850 is easily verified remotely through virtual site surveys as described herein.

In an embodiment, the security screws 300 do not use washers for installation. Also, the torque mark 850 should not get into the bolt head.

§ 10.0 3D Modeling Systems and Methods for Cell Site Audits

Figure 16:
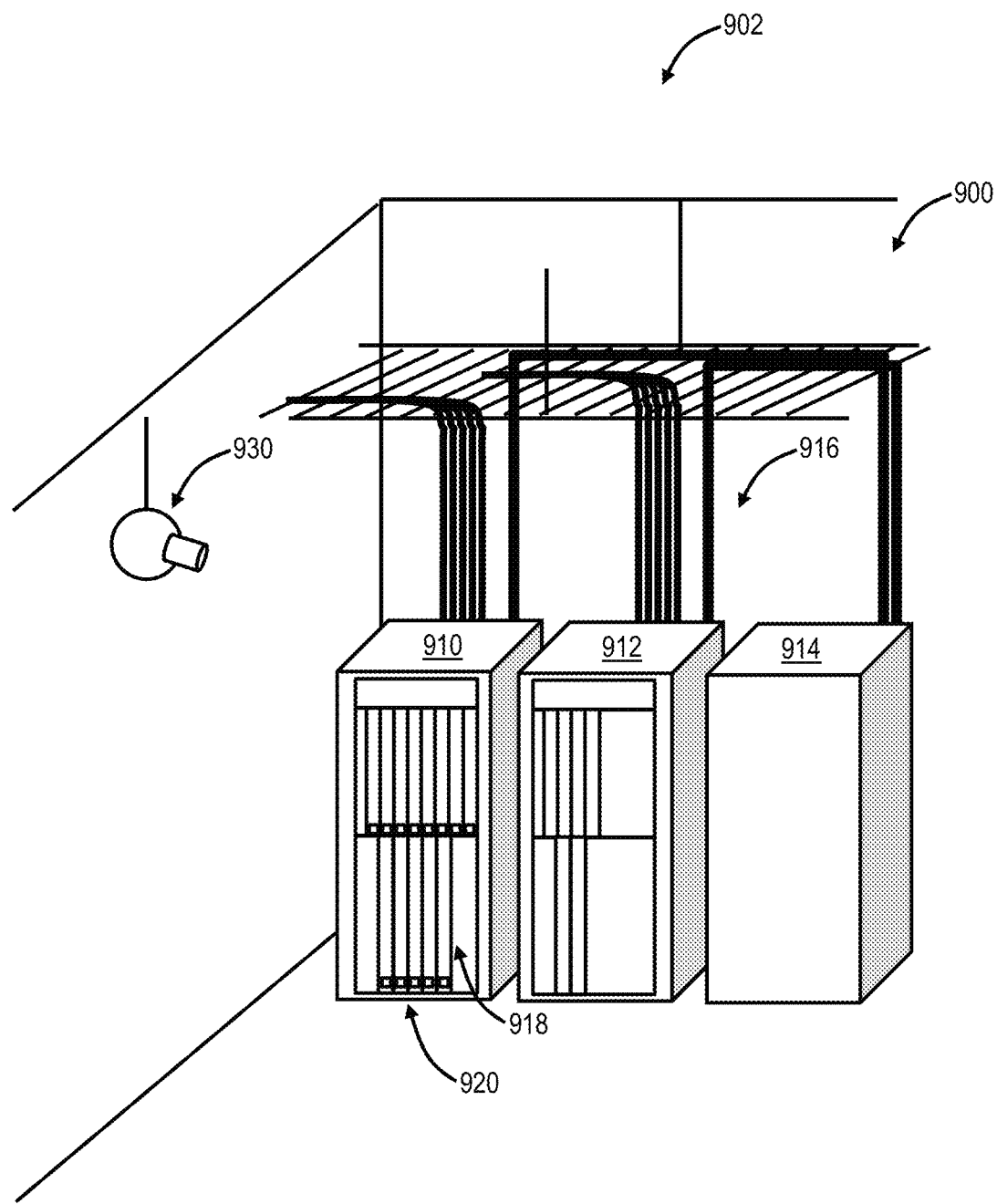
FIG. 16 is a diagram of an example interior of a building, such as a shelter, at the cell site.

Three-dimensional (3D) modeling and photo data capture can be used for remote, virtual site surveys, audits, inspections, etc. of the cell site 10, specifically the shelter 50. The photo data capture can be through any means, including portable cameras, fixed cameras, heads up displays (HUD), head mounted cameras, and the like. The systems and methods described herein contemplate the data capture through any available technique. Referring to FIG. 16, in an embodiment, a diagram illustrates an example interior 900 of a building 902, such as the shelter 50, at the cell site 10. Generally, the building 902 houses equipment associated with the cell site 10 such as wireless RF terminals 910 (e.g., LTE terminals), wireless backhaul equipment 912, power distribution 914, the batteries 400, and the like. Generally, wireless RF terminals 910 connect to the cell site components 14 for providing associated wireless service. The wireless backhaul equipment 912 includes networking equipment to bring the associated wireless service signals to a wireline network, such as via fiber optics or the like. The power distribution 914 provides power for all of the equipment such as from the grid as well as a battery backup to enable operation in the event of power failures. Of course, additional equipment and functionality are contemplated in the interior 900.

The terminals 910, equipment 912, and the power distribution 914 can be realized as rack or frame mounted hardware with cabling 916 and with associated modules 918. The modules 918 can be pluggable modules which are selectively inserted in the hardware and each can include unique identifiers 920 such as barcodes, Quick Response (QR) codes, RF Identification (RFID), physical labeling, color coding, or the like. Each module 918 can be unique with a serial number, part number, and/or functional identifier. The modules 918 are configured as needed to provide the associated functionality of the cell site.

The systems and methods include photo data capture in the interior 900 for 3D modeling and for virtual site surveys. The photo data capture can be performed by a fixed, rotatable camera 930 located in the interior 900. The camera 930 can be communicatively coupled to a Data Communication Network (DCN), such as through the wireless backhaul equipment 912 or the like. The camera 930 can be remotely controlled, such as by an engineer performing a site survey from his or her office. Other techniques of photo data capture can include an on-site technician taking photos with a camera and uploading them to a cloud service or the like. Again, the systems and methods contemplate any type of data capture.

Again, with a plurality of photos, e.g., hundreds, it is possible to utilize photogrammetry to create a 3D model of the interior 900 (as well as a 3D model of the exterior as described above). The 3D model is created using physical cues in the photos to identify objects of interest, such as the modules 918, the unique identifiers 920, or the like.

§ 11.0 Virtual Site Survey

Figure 17:
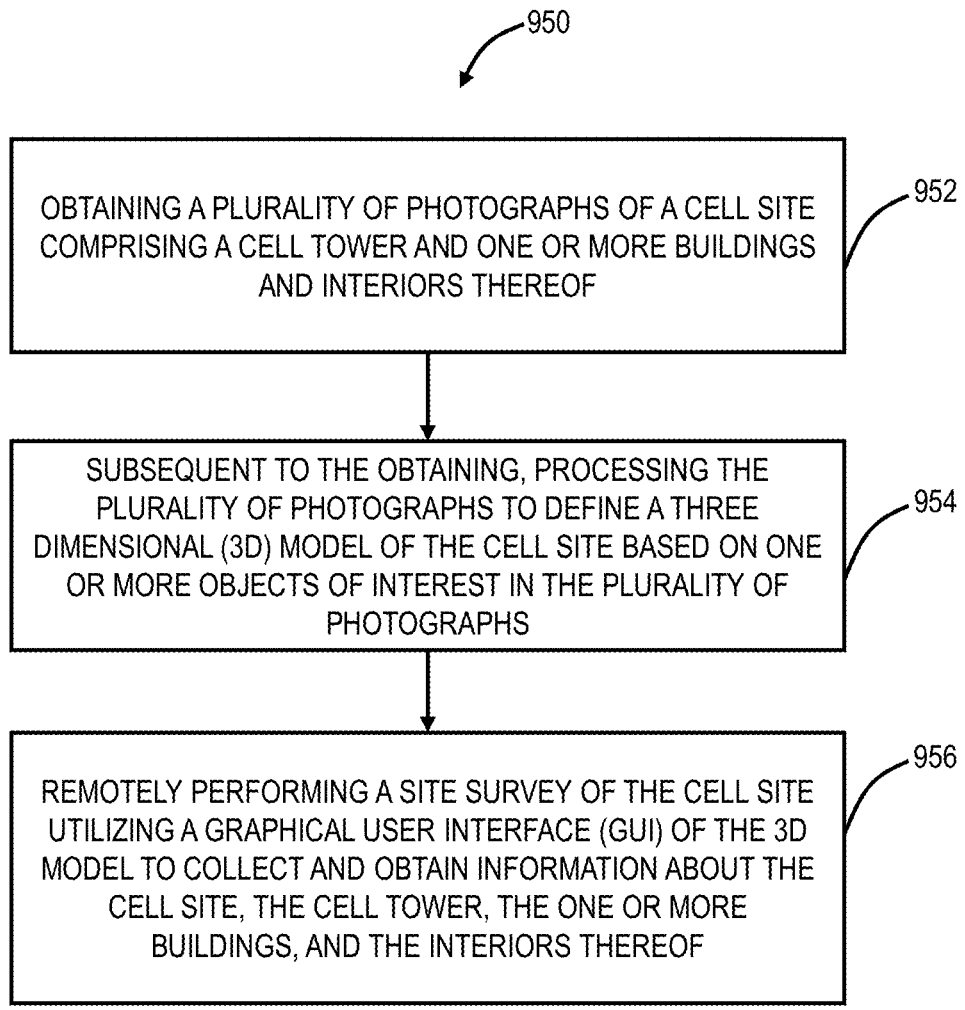
FIG. 17 is a flowchart of a virtual site survey process for the cell site.

Referring to FIG. 17, in an embodiment, a flowchart illustrates a virtual site survey process 950 for the cell site 10. The virtual site survey process 950 is associated with the cell site 10 and utilizes three-dimensional (3D) models for remote performance, i.e., at an office as opposed to in the field. The virtual site survey process 950 includes obtaining a plurality of photographs of a cell site including a cell tower and one or more buildings and interiors thereof (step 952); subsequent to the obtaining, processing the plurality of photographs to define a three dimensional (3D) model of the cell site based on one or more objects of interest in the plurality of photographs (step 954); and remotely performing a site survey of the cell site utilizing a Graphical User Interface (GUI) of the 3D model to collect and obtain information about the cell site, the cell tower, the one or more buildings, and the interiors thereof (step 956). The 3D model is a combination of an exterior of the cell site including the cell tower and associated cell site components thereon, geography local to the cell site, and the interiors of the one or more buildings at the cell site, and the 3D model can include detail at a module level in the interiors.

The remotely performing the site survey can include determining equipment location on the cell tower and in the interiors; measuring distances between the equipment and within the equipment to determine actual spatial location; and determining connectivity between the equipment based on associated cabling. The remotely performing the site survey can include planning for one or more of new equipment and changes to existing equipment at the cell site through drag and drop operations in the GUI, wherein the GUI includes a library of equipment for the drag and drop operations; and, subsequent to the planning, providing a list of the one or more of the new equipment and the changes to the existing equipment based on the library, for implementation thereof. The remotely performing the site survey can include providing one or more of the photographs of an associated area of the 3D model responsive to an operation in the GUI. The virtual site survey process 950 can include rendering a texture map of the interiors responsive to an operation in the GUI.

The virtual site survey process 950 can include performing an inventory of equipment at the cell site including cell site components on the cell tower and networking equipment in the interiors, wherein the inventory from the 3D model uniquely identifies each of the equipment based on associated unique identifiers. The remotely performing the site survey can include providing an equipment visual in the GUI of a rack and all associated modules therein. The obtaining can include obtaining the photographs on the cell tower, and the obtaining includes one or more of a fixed and portable camera obtaining the photographs in the interior. The obtaining can be performed by an on-site technician at the cell site, and the site survey can be remotely performed.

In another embodiment, an apparatus adapted to perform a virtual site survey of a cell site utilizing three-dimensional (3D) models for remote performance includes a network interface and a processor communicatively coupled to one another; and memory storing instructions that, when executed, cause the processor to receive, via the network interface, a plurality of photographs of a cell site including a cell tower and one or more buildings and interiors thereof; process the plurality of photographs to define a three dimensional (3D) model of the cell site based on one or more objects of interest in the plurality of photographs, subsequent to receiving the photographs; and provide a Graphical User Interface of the 3D model for remote performance of a site survey of the cell site utilizing the 3D model to collect and obtain information about the cell site, the cell tower, the one or more buildings, and the interiors thereof.

In a further embodiment, a non-transitory computer readable medium includes instructions that, when executed, cause one or more processors to perform the steps of receiving a plurality of photographs of a cell site including a cell tower and one or more buildings and interiors thereof; processing the plurality of photographs to define a three dimensional (3D) model of the cell site based on one or more objects of interest in the plurality of photographs, subsequent to receiving the photographs; and rendering a Graphical User Interface of the 3D model for remote performance of a site survey of the cell site utilizing the 3D model to collect and obtain information about the cell site, the cell tower, the one or more buildings, and the interiors thereof.

The virtual site survey can perform anything remotely that traditionally would have required on-site presence, including the various aspects of the cell site audit 40 described herein. The GUI of the 3D model can be used to check plumbing of coaxial cabling, connectivity of all cabling, automatic identification of cabling endpoints such as through unique identifiers detected on the cabling, and the like. The GUI can further be used to check power plant and batteries, power panels, physical hardware, grounding, heating and air conditioning, generators, safety equipment, and the like.

The 3D model can be utilized to automatically provide engineering drawings, such as responsive to the planning for new equipment or changes to existing equipment. Here, the GUI can have a library of equipment (e.g., approved equipment and vendor information can be periodically imported into the GUI). Normal drag and drop operations in the GUI can be used for equipment placement from the library. Also, the GUI system can include error checking, e.g., a particular piece of equipment is incompatible with placement or in violation of policies, and the like.

§ 12.0 Close-Out Audit Systems and Methods

A close-out audit is done to document and verify the work performed at the cell site 10. The systems and methods eliminate the separate third-party inspection firm for the close-out audit. The systems and methods include the installers (i.e., from the third-party installation firm, the owner, the operator, etc.) performing video capture subsequent to the installation and maintenance and using various techniques to obtain data from the video capture for the close-out audit. The close-out audit can be performed off-site with the data from the video capture thereby eliminating unnecessary tower climbs, site visits, and the like.

Figure 18:
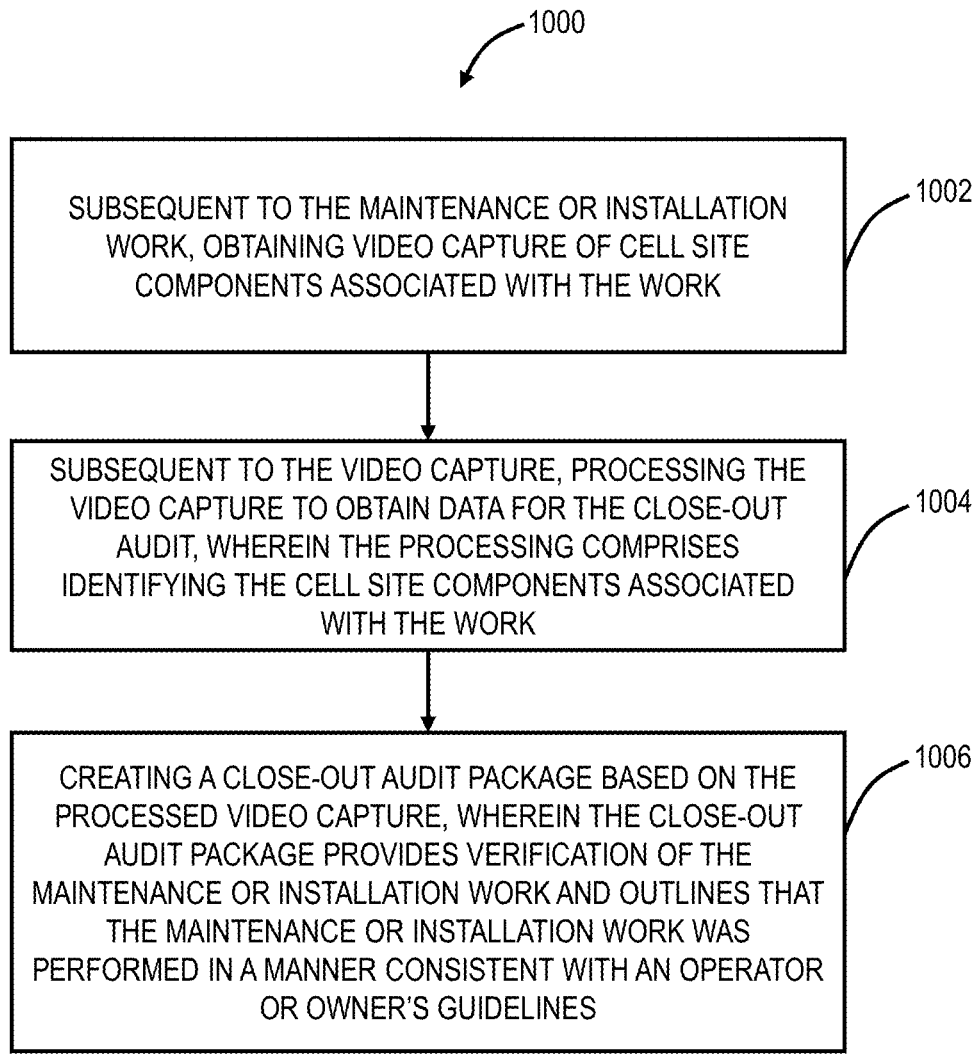
FIG. 18 is a flowchart of a close-out audit method performed at a cell site subsequent to maintenance or installation work.

Referring to FIG. 18, in an embodiment, a flowchart illustrates a close-out audit method 1000 performed at a cell site subsequent to maintenance or installation work. The close-out audit method 1000 includes, subsequent to the maintenance or installation work, obtaining video capture of cell site components associated with the work (step 1002); subsequent to the video capture, processing the video capture to obtain data for the close-out audit, wherein the processing comprises identifying the cell site components associated with the work (step 1004); and creating a close-out audit package based on the processed video capture, wherein the close-out audit package provides verification of the maintenance or installation work and outlines that the maintenance or installation work was performed in a manner consistent with an operator or owner's guidelines (step 1006).

The video capture can be performed by a mobile device and one or more of locally stored thereon and transmitted from the mobile device. The video capture can also be performed by a mobile device which wirelessly transmits a live video feed, and the video capture is remotely stored from the cell site. The video capture can also performed by an Unmanned Aerial Vehicle (UAV) flown at the cell site. Further, the video capture can be a live video feed with two-way communication between an installer associated with the maintenance or installation work and personnel associated with the operator or owner to verify the maintenance or installation work. For example, the installer and the personnel can communicate to go through various items in the maintenance or installation work to check/audit the work.

The close-out audit method 1000 can also include creating a three-dimensional (3D) model from the video capture; determining equipment location from the 3D model; measuring distances between the equipment and within the equipment to determine actual spatial location; and determining connectivity between the equipment based on associated cabling from the 3D model. The close-out audit method 1000 can also include uniquely identifying the cell site components from the video capture and distinguishing in the close-out audit package. The close-out audit method 1000 can also include determining antenna height, azimuth, and down tilt angles for antennas in the cell site components from the video capture; and checking the antenna height, azimuth, and down tilt angles against predetermined specifications.

The close-out audit method 1000 can also include identifying cabling and connectivity between the cell site components from the video capture and distinguishing in the close-out audit package. The close-out audit method 1000 can also include checking a plurality of factors in the close-out audit from the video capture compared to the operator or owner's guidelines. The close-out audit method 1000 can also include checking the grounding of the cell site components from the video capture, comparing the checked grounding to the operator or owner's guidelines and distinguishing in the close-out audit package. The close-out audit method 1000 can also include checking mechanical connectivity of the cell site components to a cell tower based on the video capture and distinguishing in the close-out audit package.

In another embodiment, a system adapted for a close-out audit of a cell site subsequent to maintenance or installation work includes a network interface and a processor communicatively coupled to one another; and memory storing instructions that, when executed, cause the processor to, subsequent to the maintenance or installation work, obtain video capture of cell site components associated with the work; subsequent to the video capture, process the video capture to obtain data for the close-out audit, wherein the processing comprises identifying the cell site components associated with the work; and create a close-out audit package based on the processed video capture, wherein the close-out audit package provides verification of the maintenance or installation work and outlines that the maintenance or installation work was performed in a manner consistent with an operator or owner's guidelines.

In a further embodiment, a non-transitory computer readable medium includes instructions that, when executed, cause one or more processors to perform the steps of, subsequent to the maintenance or installation work, obtaining video capture of cell site components associated with the work; subsequent to the video capture, processing the video capture to obtain data for the close-out audit, wherein the processing comprises identifying the cell site components associated with the work; and creating a close-out audit package based on the processed video capture, wherein the close-out audit package provides verification of the maintenance or installation work and outlines that the maintenance or installation work was performed in a manner consistent with an operator or owner's guidelines.

The close-out audit package can include, without limitation, drawings, cell site component settings, test results, equipment lists, pictures, commissioning data, GPS data, Antenna height, azimuth and down tilt data, equipment data, serial numbers, cabling, etc.

§ 13.0 Torque Mark—Virtual Site Survey and Close-Out Audit

The torque marks 850 can be applied subsequent to installation or maintenance of any connections, and these can be verified as part of the close-out audit. Subsequently, the torque marks 850 can be verified over time such as remotely via the virtual site survey.

§ 14.0 De-Celling Battery Systems and Methods

Figure 19:
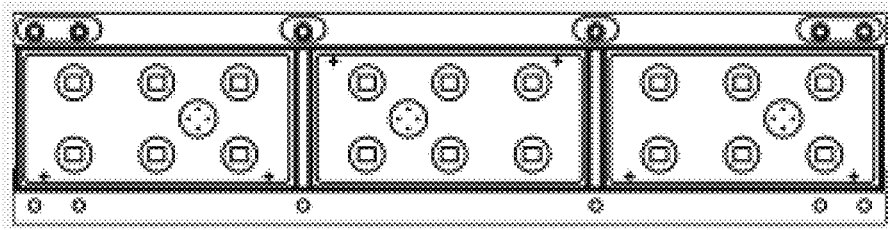
FIG. 19 is a block diagram of 2V batteries which come from a manufacturer in rack modules with three cells in each.

Referring to FIG. 19, a block diagram illustrates 2V batteries which come from a manufacturer in rack modules with three cells in each. The battery modules are stacked together to make the entire case/string of batteries. Those skilled in the art will recognize other battery configurations are also contemplated and used based on the associated application requirements (backup time requirements, power requirements, space requirements, etc.). Of note, the rack module can weigh a significant amount, e.g., 700+ pounds. This makes transport and installation difficult.

Figure 20:
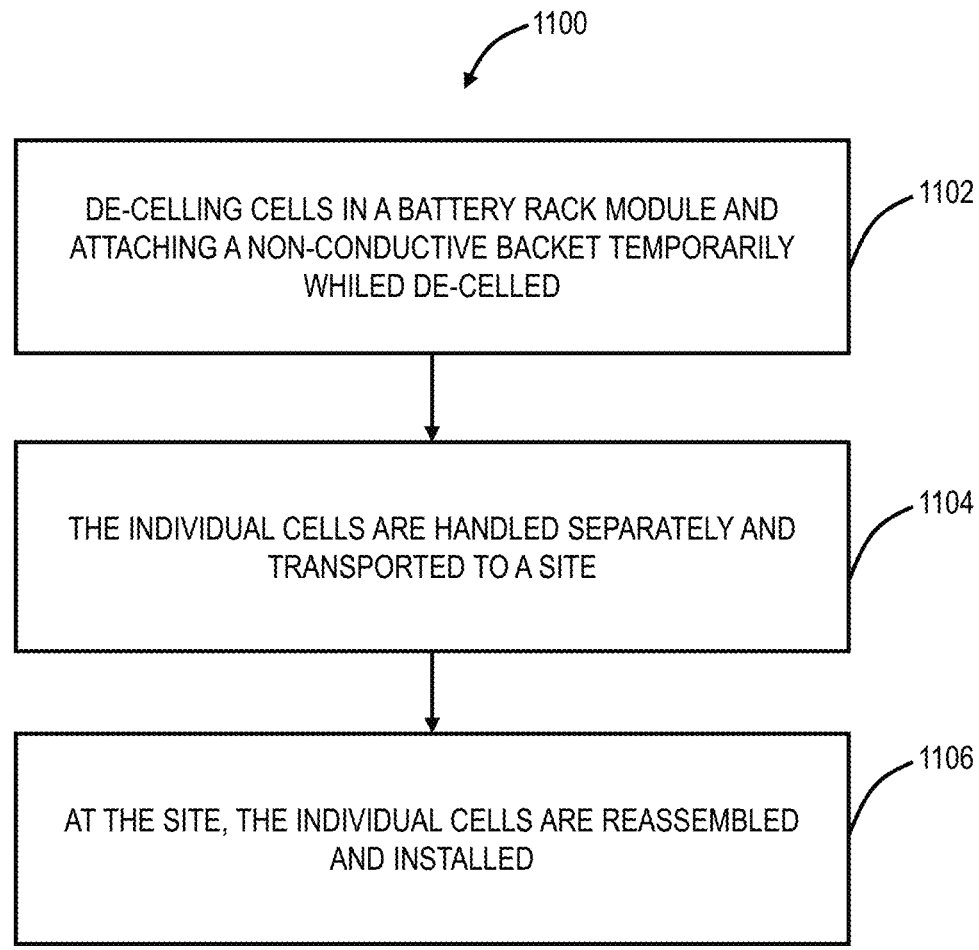
FIG. 20 is a flowchart of a battery de-celling process.

Referring to FIG. 20, in an embodiment, a flowchart illustrates a battery de-celling process 1100. The battery de-celling process 1100 is performed on batteries in a multiple-cell configuration, such as in FIG. 19, and the battery de-celling process 1100 is implemented at a staging (warehouse facility), in transport, and at a telecommunications site, such as the cell site 10.

The battery de-celling process 1100 includes de-celling cells in a battery rack module and attaching a non-conductive bracket to the de-celled cells (step 1102). Step 1102 is performed prior to installing the batteries and can be performed at a staging location, such as a warehouse, at a manufacturer, etc. The de-celling includes removing individual cells from a rack module. For example, de-celling the battery in FIG. 19 provides three separate cells and the rack module. Of course, the separate cells are easier to handle, transport, and install.

To aid in the removal of the cells from the modules, a spray lubricant can be used. The description herein refers to a spray lubricant, but those skilled in the art will recognize other products could also be used, such as a powder, a gel, petroleum, etc. Note, the use of the spray lubricant is based on a type/manufacturer of the batteries. That is, some brands of batteries require the spray lubricant whereas others do not. To del-cell the cells, the non-conductive bracket can be attached to one of the cell terminals (positive only or negative only), a strap can be attached to the bracket, and the cell is slid out by pulling on the strap. For example, the rack module can be positioned such that the sliding is parallel to the ground to aid in removal (not against gravity and optionally the spray lubricant assists in the sliding). Note, other embodiments are also contemplated including sliding the cells out at any angle, upside down, perpendicular, etc.

The individual cells are handled separately and transported to a site (step 1104). The site can include the cell site 10, such as the interior 52 of the shelter 50. Step 1104 includes the transportation from the staging location to the installation site. The individual cells and module are closer to ~200 lbs. which is easier to handle. The cells and rack modules can then be handled separately, transported to the site, and re-assembled at the site.

The transport/handling of the de-celled batteries can include placement of a protective insulator layer on a pallet, and the de-celled batteries are placed on top of the protective insulator layer on the pallet. For example, the protective insulator layer can be cardboard or the like. This is similar to the battery recycling systems and methods. Also, another cardboard layer can be placed on top of the de-celled batteries to cover the battery terminals for safe transport. The cells can be banded/strapped together and banded/strapped to the pallet. Finally, the pallet can be shrink wrapped, loaded onto a truck or the like, and transported to the site.

Once at the site, the individual de-celled cells are reassembled and installed (step 1106). Specifically, the rack module is reassembled at the site, i.e., the opposite of the de-celling, including bolting empty modules together to form battery rack, optionally using the spray lubricant to ease re-insertion of cells into the rack module, etc. The re-assembled module can then be inserted into position in the shelter 50, such as using the battery installation apparatus 100 or the like.

Figure 21:
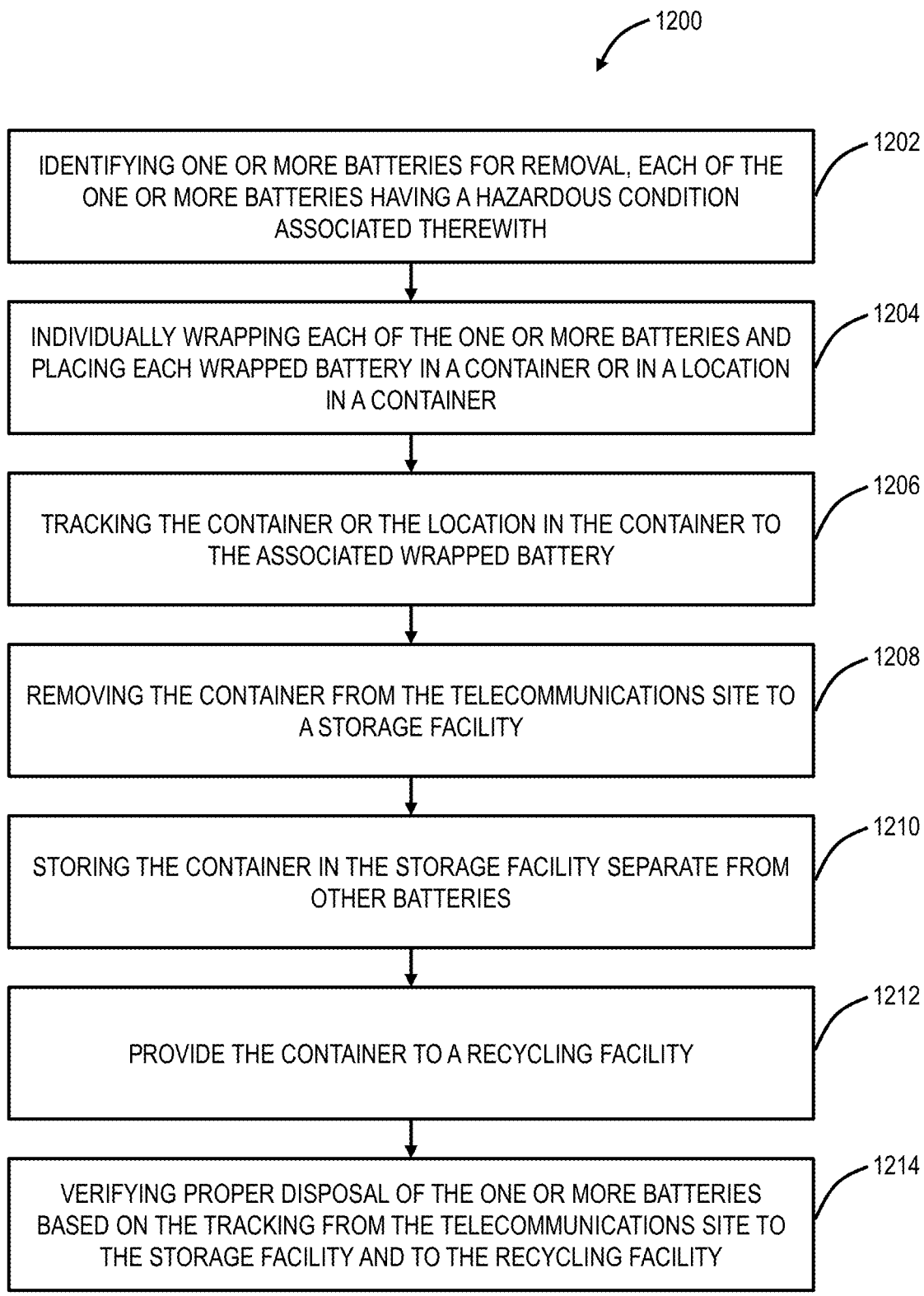
FIG. 21 is a flowchart of a process for handling hazardous or Environmental, Health, and Safety (EH&S) condition batteries.

§ 15.0 Handling Hazardous or Environmental, Health, and Safety (EH&S) Condition Batteries FIG. 21 is a flowchart of a process 1200 for handling hazardous or Environmental, Health, and Safety (EH&S) condition batteries. The process 1200 includes identifying one or more batteries for removal, each of the one or more batteries having a hazardous condition associated therewith (step 1202); individually wrapping each of the one or more batteries and placing each wrapped battery in a container or in a location in a container (step 1204); tracking the container or the location in the container to the associated wrapped battery (step 1206); removing the container from the telecommunications site to a storage facility (step 1208); storing the container in the storage facility separate from other batteries (step 1210); provide the container to a recycling facility (step 1212); and verifying proper disposal of the one or more batteries based on the tracking from the telecommunications site to the storage facility and to the recycling facility (step 1214).

The identifying is to determine batteries that are hazardous or have an EH&S condition. Once these are identified, these batteries must be handled separately from any other normal condition batteries being removed from the telecommunication site. Each individual battery must be wrapped in plastic to prevent additional contamination and each individual battery must then be placed in cardboard or rigid plastic container. The container should be labeled with a battery ID (site location), make, model, etc. and/or the container should be labeled with the hazardous condition. Once back at temporary staging facility (storage facility), the container should be stored separate from normal condition batteries, e.g., never taken off pallet and monitored for potential leaking. The container should not be packaged on any pallet containing other batteries for transport. A shipping coordinator should identify the EH&S batteries and pallets separately on BOL to alert the smelter (recycling facility) for receiving and proper handling once it is shipped to final recycling destination.

The individual wrapping can utilize a plastic wrap and the container comprises a cardboard or rigid plastic container. Each of the one or more batteries can be labeled with identification which provides a location of the telecommunications site, a make, and a model. The identification can be scannable via a mobile device which communicates with a cloud system for performing the tracking and the process 1200 can further include providing alerts based on events associated with the tracking. Each of the one or more batteries can be labeled with identification indicative of the hazardous condition. The container can be both electrically ground and sealed for containing any leakage from the one or more batteries.

The process 1200 can further include de-celling one or more cells of the one or more batteries prior to the individually wrapping. The process 1200 can further include handling the containers by placing the containers on a pallet with protective insulator layers and transporting the pallet to the storage facility and to the recycling facility. The handling can include placing individual cells on a pallet with protective insulator layers, strapping the cells together and the cells to the pallet, shrink wrapping the pallet, and transporting the pallet to the site.

The removing can utilize a battery installation apparatus including a frame including four posts, wherein the frame is dimensioned to maneuver in a shelter or cabinet; a lower shelf fixed to the frame; an upper shelf moveable on the frame, wherein each of the lower shelf and the upper shelf are dimensioned to support the batteries; and omnidirectional wheels disposed to each of the four posts. The frame can be dimensioned based on a size of the battery system and a size of the shelter or cabinet. The battery installation apparatus can further include a pulley system coupled to the four posts to vertically raise and lower a shelf of the shelves. The pulley system can include a handle which is rotated to move the upper shelf and which holds the upper shelf when the handle is stationary. The battery installation apparatus can include a rectangular shape.

The process 1200 can further include providing a recycling certificate to an operator of the telecommunications site evidencing successful recycling of the one or more batteries. Based on the tracking, a list of battery quantity, make, model, and weight from each corresponding telecommunication site can be added to the recycling certificate indicating clear chain of custody from the telecommunication site through final disposal at the recycling center.

§ 16.0 Power Cable Lug Connections

A process for power cable lug connections includes measuring the length of lug against the cable. The cable outer casing is cut back such that the exposed copper/inner cable matches the length of the lug. An appropriately sized piece of heat shrink tubing is cut and slid onto the cable above the cut/exposed portion. No-oxidation material is placed on the exposed cable section/inner cable, where the outer casing has been removed. The lug is seated onto the exposed cable section/inner cable such that the end of the lug fits snugly against the cable's outer casing. There should be no "shiner," no exposed gap between end of the lug and the cable's outer casing that would expose the copper/inner cable. The heat shrink tube is slid down to be centered over the area where the lug and the cable's outer casing meets—extending onto the lug and over the cable's outer casing. The shrink wrap is heated to specified temperature to shrink fit onto the cable's outer casing and lug. The heat shrink ensures a non-conductive barrier is in place if the lug/cable connection loosens.

§ 17.0 Battery Retention Techniques

Figure 22:
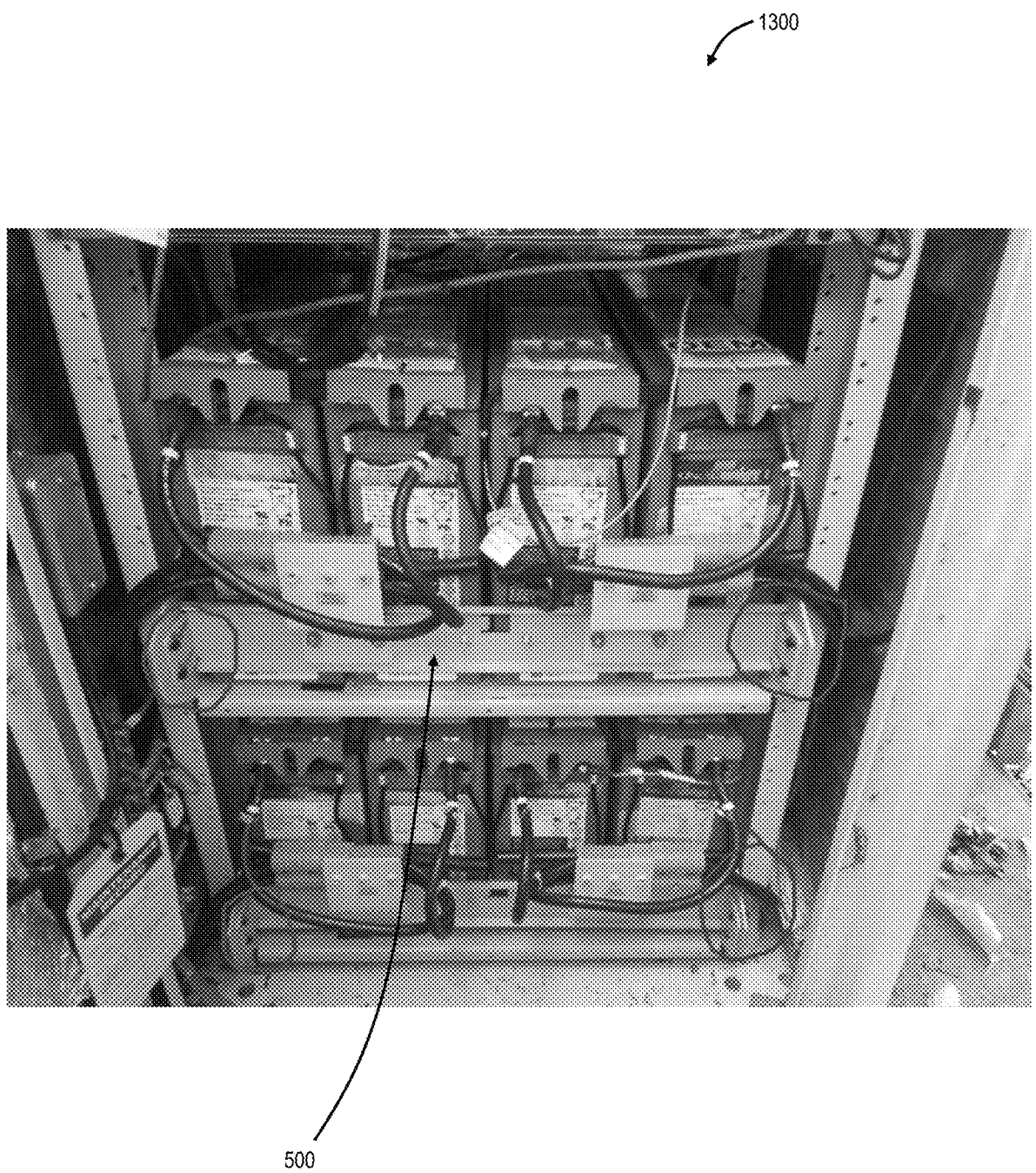
FIG. 22 is a diagram of various batteries installed in an enclosure with a security bracket.
Figure 23:
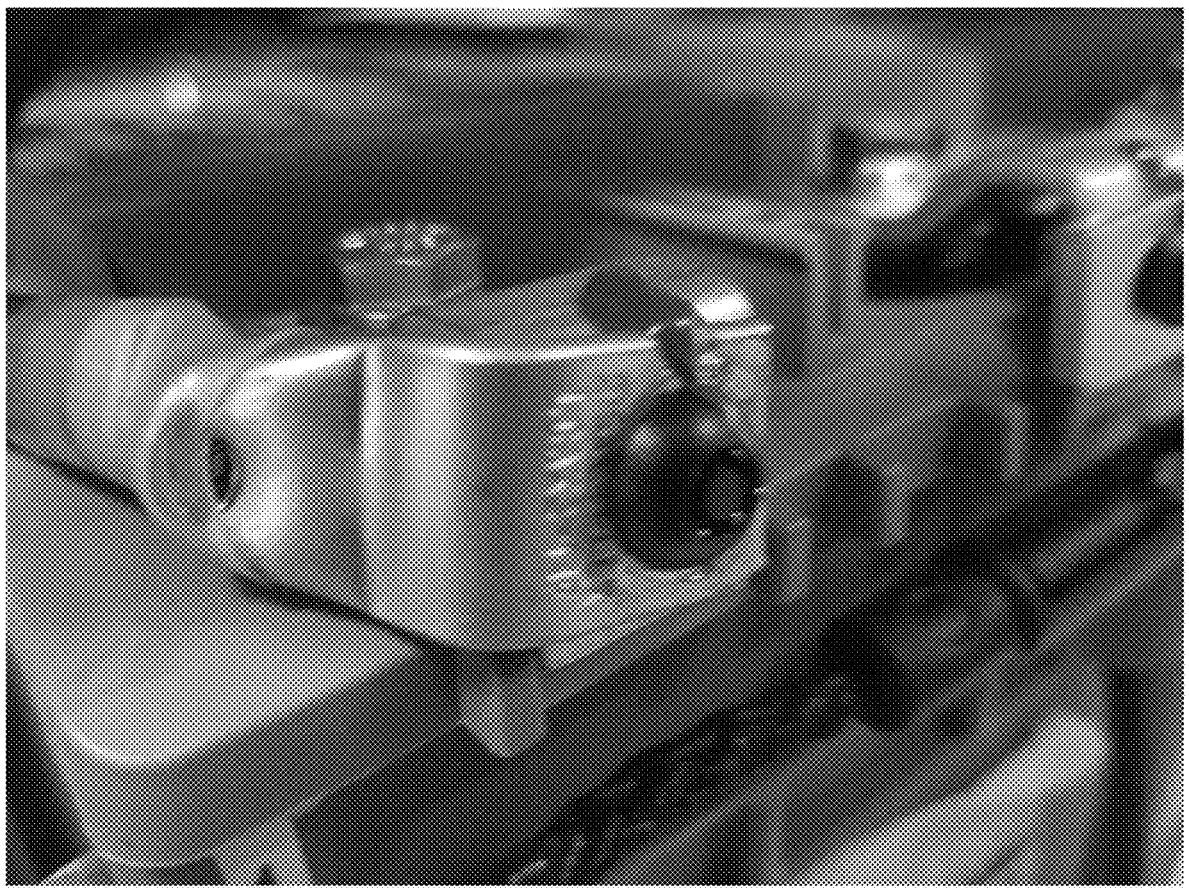
FIGS. 23 and 24 are diagrams of a security screw on the batteries.
Figure 24:
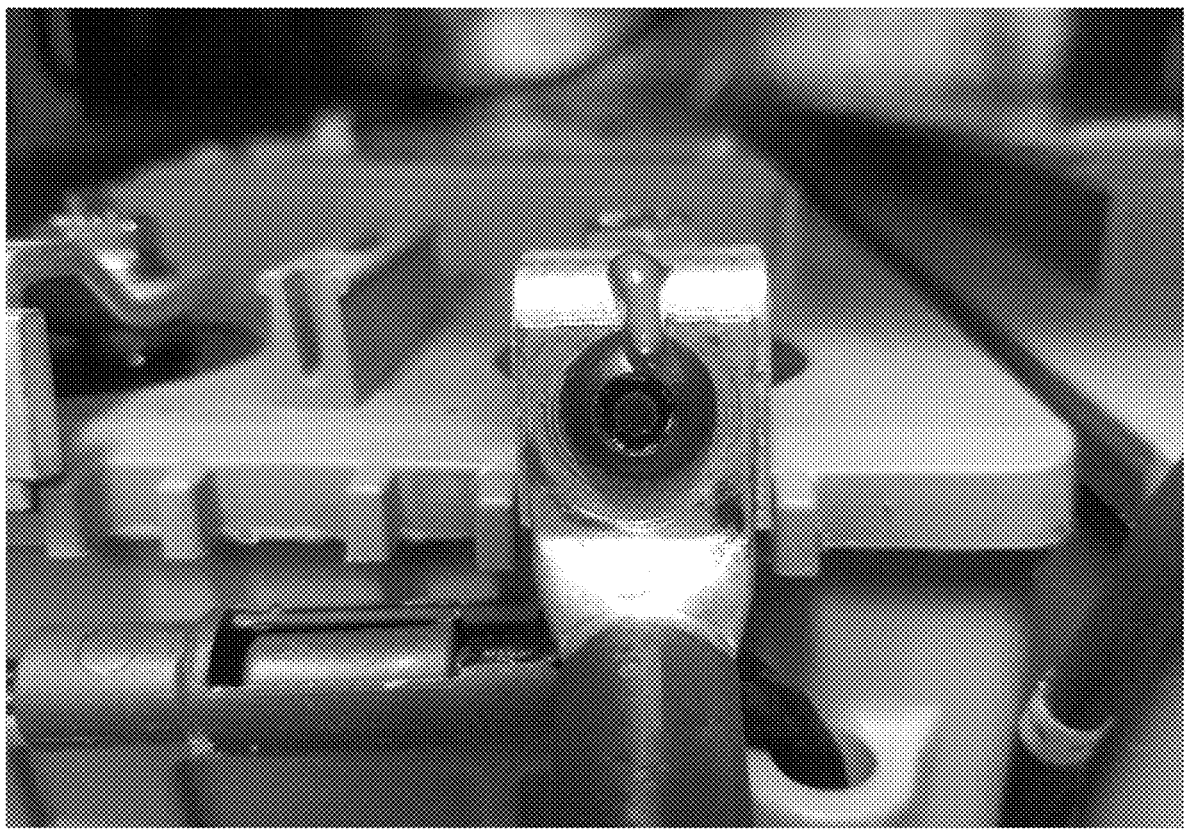

FIG. 22 is a diagram of various batteries installed in an enclosure 1300 with a security bracket 500. FIGS. 23 and 24 are diagrams of a security screw 300 on the batteries 400. In FIG. 22, the bracket 500 is installed across the enclosure 1300 thereby locking the batteries 400 in place. The bracket 500 is connected to the enclosure 1300 via the security screw 300.

The bracket 500 is fabricated/formed with additional material on the sides to prevent or discourage cutting. Of course, it is still possible to cut the bracket 500 in place, but the additional material causes difficulty and delay. Specifically, the bracket 500 includes edges along the length on the top and bottom. These edges are fabricated with the bracket 500. The edges make it difficult for a straight cut to the bracket 500. The bracket 500 can have an expanded height of existing bracket, especially at the sides and covering the space between each battery (require longer cut to remove.)

The bracket 500 can further include a second bracket above connected thereto and which can also to be installed with security screws 300. The bracket 500 can wrap around the sides and/or underneath the batteries 400 to further increase the difficulty of cutting the batteries out. Further, the bracket 500 can include a strong metal used in fabrication to increase difficulty of cutting (e.g., high carbon steel or other alloy type that would be difficult for a normal blade to cut).

In an embodiment, battery installation method in a shelter or cabinet includes responsive to placing one or more batteries in the shelter or cabinet, connecting terminals on each of the one or more batteries to associated terminal plates with associated security screws; and connecting a bracket to a housing in the shelter or cabinet with associated security screws, wherein the bracket spans across the one or more batteries and wherein the bracket comprises raised edges which deter cutting. The battery installation method can further include connecting a second bracket to the bracket and the one or more batteries with associated security screws. The bracket can include high carbon steel.

The security screws can be installed with a unique tool specially designed for the associated security screws to deter tampering. The security screws can include spanner screws. The security screws can include one-way screws. The security screws can include tamper-resistant Allen-head screws each with a protruding pin. The security screws can include uniquely designed screw heads with a corresponding unique tool.

The placing can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system.

The battery installation method can further include moving the battery installation apparatus into the shelter or cabinet to the location; removing old batteries from the battery system and placing the old batteries on the shelves; moving the battery installation apparatus out of the shelter or cabinet; and removing the old batteries.

§ 18.0 Magnetic Track System

Figure 25:
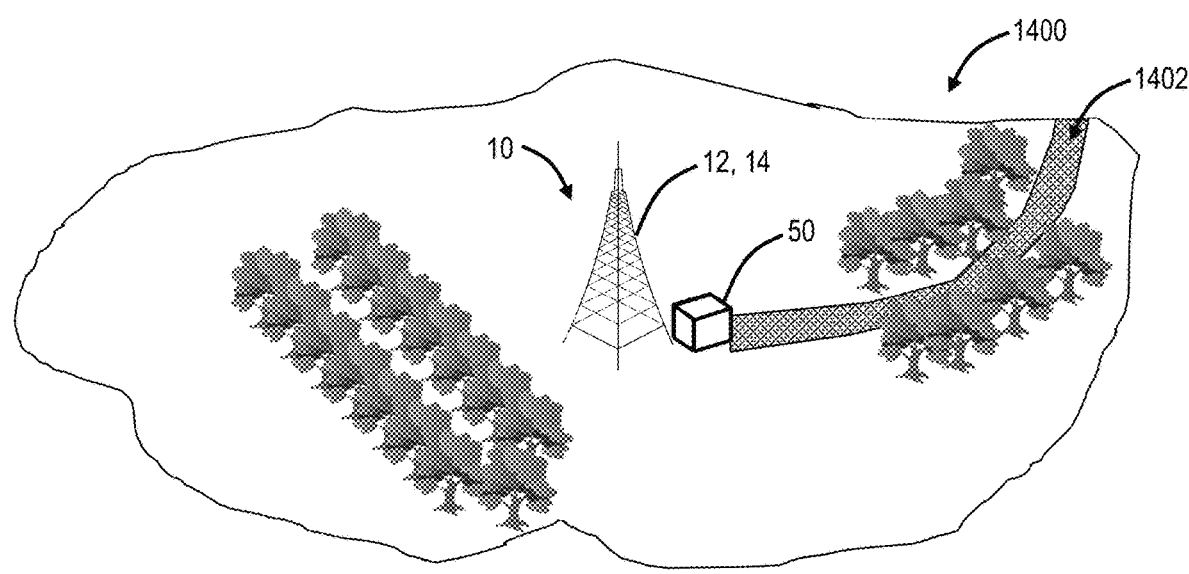
FIG. 25 is a diagram of a cell site and surrounding geography which can include an access road.
Figure 26:
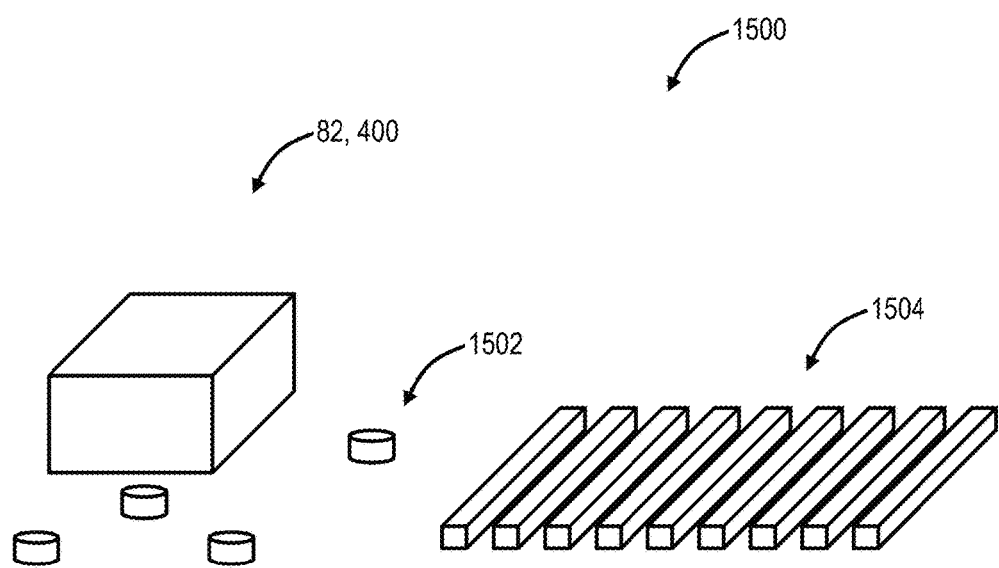
FIG. 26 is a diagram of a magnetic track system which can transport batteries.
Figure 27:
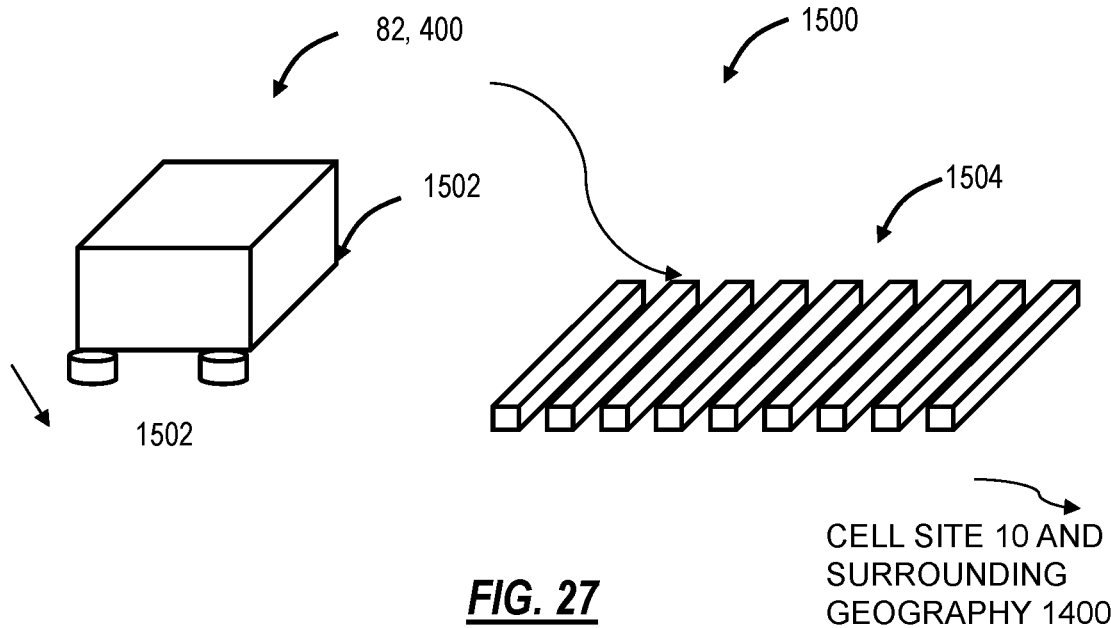
FIG. 27 shows the system of FIG. 26 with the magnetized pods secured to the battery and further details of the embodiment.

FIG. 25 is a diagram of a cell site 10 and surrounding geography 1400 which can include an access road 1402. FIG. 26 is a diagram of a magnetic track system 1500 which can transport batteries 82, 400. In a typical scenario, the batteries 82, 400 are loaded on a vehicle and transported to the cell site 10. The vehicle is driven to the shelter 50 on the access road 1402. At this point, the batteries 82, 400 need to be unloaded from the vehicle and brought to the interior 52 of the shelter 50. As mentioned herein, the batteries 82, 400 can weigh hundreds of pounds.

The magnetic track system 1500 is used to more easily transport the batteries 82, 400 from a vehicle on the access road 1402 to the interior 52 of the shelter 50 (or a cabinet, power plant, etc.). The magnetic track system 1500 includes magnetize pods 1502 which can be attached to the battery 82, 400, e.g., four pods 1502 which can be attached to each corner of a battery 82, 400 for transport. The magnetic track system 1500 also includes tracks 1504, strips, or mats which can be laid down from the vehicle to the installation point of the battery 82, 400. The tracks 1504 include repelling magnets which lift the battery 82, 400 with the pods 1502 for transport.

The action of the pods 1502 over the tracks 1504 removes the lifting component of battery installation. Instead, a technician can push/pull the battery 82, 400 to the install location. This can enable a single technician at the cell site 10.

The tracks 1504 can be for a set length and if a longer length is needed, the tracks over which the battery 82, 400 has already passed can be moved to the front. Further, the tracks 1504 can be used for stairs, inclines, etc. Also, the pods 1502 could be attached to sides of the battery 82, 400 allowing a technician to apply on the other side to push the battery along the path to final destination.

In an embodiment, a magnetic track system for transporting batteries at a telecommunications site includes a plurality of pods which are magnetic and which are attachable to a battery; and a track system including repelling magnets, wherein the track system is selectively laid between a first point to a second point to transport the battery with the plurality of pods attached thereto, wherein the transport comprises pushing or pulling the battery along the track system. The track system can include a plurality of tracks, strips, or a rollable mat. The track system can have a length less than a distance between the first point and the second point, wherein the track system is moveable such that tracks which have already been traversed by the battery are moved to a front to accommodate the distance.

In another embodiment, a method using a magnetic track system for transporting batteries at a telecommunications site includes attaching a plurality of pods which are magnetic to a battery; deploying a track system including repelling magnets, wherein the track system is selectively laid between a first point to a second point to transport the battery with the plurality of pods attached thereto; and one or more of pushing or pulling the battery along the track system.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A magnetic track system configured to transport a battery or batteries from an access point to an installation point of a telecommunications site, comprising:
   a plurality of pods configured to attach to the battery, wherein the plurality of pods comprise magnetized pods each secured to a corner of the battery, and the battery is a telecommunications battery configured to install on an associated battery system at the telecommunications site; and
   a plurality of tracks aligned next to each other and the plurality of tracks comprising repelling magnets configured to repel the magnetized pods of the battery upon contact therewith when the battery is placed on the tracks, wherein the plurality of tracks configure to move the battery with the plurality of pods attached thereto from the access point to the installation or final destination point by pushing or pulling the battery along the plurality of tracks.

2. The magnetic track system of claim 1, wherein the plurality of tracks comprise a plurality of strips.

3. The magnetic track system of claim 1, wherein the plurality of tracks are configured to be traversed by the battery, and each track is configured to attach and detach from other tracks such that tracks of the plurality of tracks which have already been traversed by the battery are moved to an opposing end of the plurality of tracks which has yet to be traversed by the battery.

* * * * *